US012784703B2

(12) United States Patent
Crounse et al.

(10) Patent No.: US 12,784,703 B2
(45) Date of Patent: Nov. 3, 2026

(54) VELOCITY COMPENSATED WAVEFORMS FOR NON-FLASHY UPDATES OF ELECTROPHORETIC DISPLAYS

(71) Applicant: E INK CORPORATION, Billerica, MA (US)

(72) Inventors: Kenneth R. Crounse, Somerville, MA (US); Manuel Jenkin Jerome, Boston, MA (US); Varun Maheshwari, Billerica, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 19/435,507

(22) Filed: Dec. 29, 2025

(65) Prior Publication Data

US 2026/0188270 A1 Jul. 2, 2026

Related U.S. Application Data

(60) Provisional application No. 63/740,979, filed on Dec. 31, 2024.

(51) Int. Cl.
*G09G 3/34* (2006.01)
*G09G 3/20* (2006.01)

(52) U.S. Cl.
CPC .......... *G09G 3/344* (2013.01); *G09G 3/2044* (2013.01); *G09G 2320/0247* (2013.01)

(58) Field of Classification Search
None
See application file for complete search history.

(56) References Cited

U.S. PATENT DOCUMENTS 10,242,630 B2 * 3/2019 Telfer .................... G02F 1/167
10,276,109 B2 * 4/2019 Crounse ................ G09G 3/344
2017/0287407 A1 * 10/2017 Telfer .................... G02F 1/167

FOREIGN PATENT DOCUMENTS

WO 2024000181 A1 1/2024

OTHER PUBLICATIONS

European Patent Organization, "International Search Report and Written Opinion", PCT/US2025/061544, Mar. 12, 2026.

* cited by examiner

*Primary Examiner* — Parul H Gupta
(74) *Attorney, Agent, or Firm* — Brian D. Bean

(57) ABSTRACT

An electrophoretic display and a method for driving an electrophoretic display are disclosed for minimizing visible flicker during pixel transitions between black and white optical states. The method generates distinct transition waveforms for black-to-white and white-to-black transitions. Each waveform includes a plurality of full-velocity voltage segments followed by at least one reduced-velocity segment having a smaller voltage magnitude. For black-to-white transitions, the reduced-velocity segment occurs last; for white-to-black transitions, it occurs first. These tailored waveforms are applied to respective display pixels such that the transition velocity of a display pixel changing from black to white substantially matches that of a display pixel changing from white to black. This approach improves visual stability and reduces flicker artifacts during display updates.

21 Claims, 13 Drawing Sheets

VELOCITY COMPENSATED WAVEFORMS FOR NON-FLASHY UPDATES OF ELECTROPHORETIC DISPLAYS

CROSS-REFERENCE TO RELATED APPLICATIONS

This application claims priority to U.S. Provisional Application No. 63/740,979, filed on Dec. 31, 2024, the entire contents of which are incorporated herein by reference. Further, the entire contents of any patent, published application, or other published work referenced herein are incorporated by reference in their entireties.

FIELD OF THE INVENTION

The subject matter disclosed herein relates to methods for driving electro-optic displays, especially bistable electro-optic displays, and to apparatuses for carrying out such methods. More specifically, the subject matter disclosed herein relates to driving methods for tuning the velocity of optical transitions to minimize visual flicker, and provide a smooth transition appearance.

BACKGROUND OF THE INVENTION

An electrophoretic display (EPD) changes color by modifying the position of a charged colored particle with respect to a light-transmissive viewing surface. Such electrophoretic displays are typically referred to as "electronic paper" or "ePaper" because the resulting display has high contrast and is sunlight-readable, much like ink on paper. In the simplest sense, an electrophoretic display only requires a light-transmissive electrode at the viewing surface, a back electrode, and an electrophoretic medium including one or more types of charged colored particles. If the back electrode includes controllable regions (pixels)

- either segmented electrodes or an active matrix of pixel electrodes controlled by transistors
- a pattern can be made to appear electronically at the viewing surface. The pattern can be, for example, the text to a book.

A variety of color option have become commercially available for electrophoretic displays, including four-color displays (black, white, red, yellow; red, white, yellow, semi-transparent blue; cyan, yellow, magenta, white). Electrophoretic displays with four types of electrophoretic particles operate similar to the simple black and white displays EPDs when, for example, a single color matching the color of one of the particles is desired at the viewing surface. However, obtaining a broader color gamut, including mixed colors and process colors is more complicated and requires more exquisite control of the relative positions of the particles with respect to each other and the viewing surface. When done correctly, such four particle systems allow hundreds of different colors to be produced at each pixel. More details of such systems are available in the following U.S. Patents, all of which are incorporated by reference in their entireties: U.S. Pat. Nos. 9,361,836, 9,921,451, 10,276,109, 10,353,266, 10,467,984, and 10,593,272.

Color electrophoretic displays can also be achieved using color filters arrays (CFA) disposed above or below a layer of electrophoretic display materials, for example a layer of microcapsules with black and white oppositely-charged particles that change position relative to a viewer due to a provided electric field. See, e.g., U.S. Pat. Nos. 8,098,418 and 10,444,592. However, electrophoretic displays incorporating CFAs suffer from loss of color spatial resolution due to subpixels. See, e.g., FIGS. 1D and 1E of the instant application, illustrating that a "pixel" (dashed bounding box) of a CFA-enabled display typically comprises at least three individually-controllable subpixels. Traditionally, CFA displays have red, green, and blue filters, however other complimentary sets of colors can be used. Because of the subpixels, if one of the primary colors is to be shown for a pixel of the display, the pixel has only one third or less (less because there is filling between subpixels) of the display area to be utilized for showing that color. The other subpixels are dark to increase the chromaticity of the desired color.

Of course, most color images require more than red, green, blue, black, and white pixels. While it is possible to approximate some colors (e.g., purple) with mixes of subpixels, a more common method is to dither the colors across the pixels in an image to achieve the desired color and shading. However, when dithering is used to increase the available colors in an electrophoretic display, the dithered subpixels involved in the dithering process may be subject to unwanted cross-talk with nearby subpixels, which can result in dithered colors looking "off." See, e.g., U.S. Pat. No. 11,869,451. Additional problems arise when, e.g., only part of the image is updated (a.k.a. partial update), which can also result in colors on the non-updated edges on the border of the updated pixels looking "off." See, e.g., U.S. Pat. No. 11,557,260.

Electro-optic displays typically have a backplane provided with a plurality of pixel electrodes each of which defines one pixel of the display. Each pixel electrode is typically disposed in a rectangular array of pixel electrodes and each pixel electrode is controlled with a thin-film transistor (TFT), and the TFTs are updated in a row-by-row fashion. Conventionally, a single common electrode extending over a large number of pixels, and normally the whole display is provided on the opposed side of the electro-optic medium. The individual pixel electrodes may be driven directly (i.e., a separate conductor may be provided to each pixel electrode) or the pixel electrodes may be driven in an active matrix manner which will be familiar to those skilled in backplane technology. Since adjacent pixel electrodes will often be at different voltages, they must be separated by inter-pixel gaps of finite width in order to avoid electrical shorting between electrodes. Although at first glance it might appear that the electro-optic medium overlying these gaps would not switch when drive voltages are applied to the pixel electrodes (and indeed, this is often the case with some non-bistable electro-optic media, such as liquid crystals, where a black mask is typically provided to hide these non-switching gaps), in the case of many bistable electro-optic media the medium overlying the gap does switch because of a phenomenon known as "blooming".

Blooming refers to the tendency for application of a drive voltage to a pixel electrode to cause a change in the optical state of the electro-optic medium over an area larger than the physical size of the pixel electrode. An area of blooming is not a uniform color, but is typically a transition zone where, as one moves across the area of blooming, the color of the medium transitions from the desired color to another shade or color, for example a desired white pixel may include various shades of gray along the edges, a.k.a., "edge ghosting". Furthermore, depending upon the type of display, i.e., black/white, color, black/white with color filter, the results of the edge ghosting can range from annoying to debilitating. In some cases, asymmetric blooming may contribute to edge ghosting.

Much of the discussion below will focus on methods for driving one or more pixel electrodes of an electro-optic display through a transition from a first optical (i.e., color) state to a final optical state (which may or may not be different from the initial optical state). The term "waveform" will be used to denote the entire voltage against time curve used to effect the transition from one specific first color state to a specific second color state. Typically such a waveform will comprise a plurality of waveform elements; where these elements are essentially rectangular (V×t) voltage pulses (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

The terms bistable and bistability are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called multi-stable rather than bistable, although for convenience the term bistable may be used herein to cover both bistable and multi-stable displays. While the bistable nature of electrophoretic displays allows for massive power savings over traditional "always on" displays such as LCD and LED, the bistability can lead to image retention between updates, a.k.a. "ghosts".

The term impulse, when used to refer to driving an electrophoretic display, is used herein to refer to the integral of the applied voltage with respect to time during the period in which the display is driven. The term waveform, when used to refer to driving an electrophoretic display is used to describe a series or pattern of voltages provided to an electrophoretic medium over a given time period (seconds, frames, etc.) to produce a desired optical effect in the electrophoretic medium.

A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for U.S. Pat. Nos. 7,116,318 and 7,535,624;

(g) Color formation color adjustment; see for example U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175; 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,170,468; 9,182,646; 9,195,111; 9,199,441; 9,268,191; 9,285,649; 9,293,511; 9,341,916; 9,360,733; 9,361,836; 9,383,623; and 9,423,666; and U.S. Patent Applications Publication Nos. 2008/0043318; 2008/0048970; 2009/0225398; 2010/0156780; 2011/0043543; 2012/0326957; 2013/0242378; 2013/0278995; 2014/0055840; 2014/0078576; 2014/0340430; 2014/0340736; 2014/0362213; 2015/0103394; 2015/0118390; 2015/0124345; 2015/0198858; 2015/0234250; 2015/0268531; 2015/0301246; 2016/0011484; 2016/0026062; 2016/0048054; 2016/0116816; 2016/0116818; and 2016/0140909;

(h) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305, 341; 8,314,784; 8,373,649; 8,384,658; 8,456,414; 8,462,102; 8,514,168; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0091418; 2007/0103427; 2007/0176912; 2008/0024429; 2008/0024482; 2008/0136774; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2015/0262551; 2016/0071465; 2016/0078820; 2016/0093253; 2016/0140910; and 2016/0180777;

(i) Applications of displays; see for example U.S. Pat. Nos. 7,312,784 and 8,009,348; and (j) Non-electrophoretic displays, as described in U.S. Pat. No. 6,241,921; and U.S. Patent Applications Publication Nos. 2015/0277160; and U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449.

Although electrophoretic media are often opaque (since, for example, in many electrophoretic media, the particles substantially block transmission of visible light through the display) and operate in a reflective mode, many electrophoretic displays can be made to operate in a so-called shutter mode in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode can be used in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively. Additionally, as described in U.S. Patent Application Publication No. 2021/0132459, encapsulated electrophoretic media can be incorporated into non-planar surfaces that are, in turn, incorporated into everyday objects. As a result, surfaces of products, building materials, etc. can be engineered to change color when a suitable electric field is supplied.

For the most part, electrophoretic media, such as described above, are designed to be driven with low voltage square waves, such as produced by a driver circuit from a thin-film-transistor backplane. Such driver circuits can be inexpensively mass-produced because they are very closely related to the driving circuitry and fabrication methods that are used to produce liquid crystal display panels, such as found in smart phones, laptop monitors, and televisions. Historically, even when electrophoretic media are driven directly via an isolated electrode (e.g., segmented electrode) the driving pulses are delivered as square waves, having an amplitude and a time width. See, for example, U.S. Pat. No. 7,012,600, incorporated by reference in its entirety. Typically, for an active matrix backplane including an array of pixel electrodes, each pixel electrode will receive a signal pulse (square wave) for a short period of time as the array of pixel electrodes are addressed in a line-by-line fashion. The period of time that it takes to update the entire array of pixels, and also the time between updates of an individual pixel electrode is known as a frame. The collection of voltage impulses required to change the display from a first display state to a second state is generally known as a waveform. A waveform typically includes at least three frames, e.g., as described in U.S. Pat. No. 11,620,959, which is incorporated by reference in its entirety.

When the electrophoretic medium includes multiple types of particles with the same charge polarity but different charge magnitudes, the final position of a given set of particles (and the optical state) is typically controlled with a sequence of positive and negative voltage impulses. For example, all of the positive particles may be driven to the viewing surface and then a combination of negative and positive voltages serves to disaggregate the collection of positive particles and drive the unwanted positive particles away from the view surface so that only the desired particle sets are viewed. However, driving methods that require multiple positive and negative pulses often result in color transitions that are visibly jarring to a user, also known as "flashy updates." It is possible to decrease the amount of flash by making the waveforms longer and using smaller voltage steps, however such waveforms are not suitable for applications such as page turning or stylus writing. In such applications, a user expects a nearly instantaneous response by the display and high contrast between first and second optical states. (See, e.g., U.S. Patent Publication No. 2022/0262323 for a description of long gradual waveforms.) Historically, it has been difficult to achieve a short, low flash, low latency color waveform for such multi-particle systems.

SUMMARY OF THE INVENTION

Accordingly, there is a need for methods for tuning the velocity of optical transitions in electrophoretic displays to minimize visual flicker, and to provide a smooth transition appearance.

In one aspect, the subject matter disclosed herein includes a method for driving an electrophoretic display to reduce visible flicker during display pixel transitions between optical states. The method includes generating a black-to-white transition waveform. The black-to-white transition waveform includes a first plurality of full-velocity black-to-white voltage segments having a first negative voltage. The black-to-white transition waveform also includes a reduced-velocity black-to-white voltage segment having a second negative voltage. The second negative voltage has a magnitude smaller than the first negative voltage. The at least one reduced-velocity black-to-white voltage segment is the last voltage segment of the black-to-white transition waveform. The method also includes generating a white-to-black transition waveform. The white-to-black transition waveform includes a second plurality of full-velocity white-to-black voltage segments at a first positive voltage. The white-to-black transition waveform also includes a reduced-velocity white-to-black voltage segment having a second positive voltage. The second positive voltage has a magnitude smaller than the first positive voltage. The at least one reduced-velocity white-to-black voltage segment is the first voltage segment of the white-to-black transition waveform. The method also includes applying the black-to-white transition waveform to a first display pixel to transition an optical state of the first display pixel from black to white, and applying the white-to-black transition waveform to a second display pixel to transition an optical state of the second display pixel from white to black. The black-to-white transition waveform and the white-to-black transition waveform are configured such that a velocity of the transition of the first display pixel from black to white substantially matches a velocity of the transition of the second display pixel from white to black.

In some embodiments, a duration of each voltage segment corresponds to a duration of one frame. In some embodiments, the first negative voltage has a magnitude of substantially −24V. In some embodiments, the second negative voltage has a magnitude of substantially −6V. In some embodiments, the first positive voltage has a magnitude of substantially 24V. In some embodiments, the second positive voltage has a magnitude of substantially 6V.

In some embodiments, the first negative voltage has a magnitude at least three times larger than the second negative voltage. In some embodiments, the first positive voltage has a magnitude at least three times larger than the second positive voltage.

In some embodiments, the black-to-white transition waveform is applied to the first display pixel during frames coincident with frames in which the white-to-black transition waveform is applied to the second display pixel.

In another aspect, the subject matter disclosed herein includes a method for driving an electrophoretic display to reduce visible flicker during display pixel transitions between optical states. The method includes generating a black-to-white transition waveform. The black-to-white transition waveform includes a first plurality of full-velocity black-to-white voltage segments having a first negative voltage. The black-to-white transition waveform also includes a first plurality of reduced-velocity black-to-white voltage segments having a second negative voltage. The second negative voltage has a magnitude smaller than the first negative voltage. At least one of the reduced-velocity black-to-white voltage segments is the last voltage segment of the black-to-white transition waveform. The method also includes generating a white-to-black transition waveform. The white-to-black transition waveform includes a first plurality of full-velocity white-to-black voltage segments having a first positive voltage, and a first plurality of reduced-velocity white-to-black voltage segment having a second positive voltage. The second positive voltage has a magnitude smaller than the first positive voltage. At least one of the reduced-velocity white-to-black voltage segments is the first voltage segment of the white-to-black transition waveform. The method also includes applying the black-to-white transition waveform to a first display pixel to transition an optical state of the first display pixel from black to white, and applying the white-to-black transition waveform to a second display pixel to transition an optical state of the second display pixel from white to black. The black-to-white transition waveform and the white-to-black transition waveform are configured such that a velocity of the transition of the first display pixel from black to white substantially matches a velocity of the transition of the second display pixel from white to black.

In some embodiments, a duration of each voltage segment corresponds to a duration of one frame. In some embodiments, the first negative voltage has a magnitude of substantially −24V. In some embodiments, the second negative voltage has a magnitude of substantially −6V. In some embodiments, the first positive voltage has a magnitude of substantially 24V. In some embodiments, the second positive voltage has a magnitude of substantially 6V.

In some embodiments, the first negative voltage has a magnitude at least three times larger than the second negative voltage. In some embodiments, the first positive voltage has a magnitude at least three times larger than the second positive voltage.

In some embodiments, the black-to-white transition waveform is applied to the first display pixel during frames coincident with frames in which the white-to-black transition waveform is applied to the second display pixel. In some embodiments, the first plurality of full-velocity black-to-white voltage segments and the first plurality of reduced-velocity black-to-white voltage segments of the black-to-white transition waveform are applied to the first display pixel in a first order.

In some embodiments, the first plurality of full-velocity white-to-black voltage segments and the first plurality of reduced-velocity white-to-black voltage segments of the white-to black transition waveform are applied to the second display pixel in a second order that is a reverse permutation of the first order. In some embodiments, the black-to-white transition waveform comprises a sequence of i voltage segments, and the white-to-black transition waveform comprises a sequence of n voltage segments, and an order in which the sequence of i voltage segments is applied to the first display pixel corresponds to an order in which the sequence of n voltage segments is applied to the second display pixel according to the function: $f(i)=n-i+1$, such that $A_i \leftrightarrows B_{f(i)}=B_{n-i+}1$, where: $A_i$ represents the sequence of i voltage segments in order, and $B_{f(i)}$ represents the sequence of n voltage segments in order.

BRIEF DESCRIPTION OF DRAWINGS

Additional details of one or more embodiments of the subject matter described in this specification are set forth in the accompanying drawings and the description below. Other features, aspects, and advantages of the subject matter will become apparent from the descriptions contained herein and the accompanying drawings. The drawings are not necessarily to scale and elements of similar structures are generally annotated with like reference numerals for illustrative purposes throughout the drawings. However, the specific properties and functions of elements in different embodiments may not be identical. Further, the drawings are only intended to facilitate the description of the subject matter. The drawings do not illustrate every aspect of the described embodiments and do not limit the scope of the present disclosure or claims.

DETAILED DESCRIPTION OF THE INVENTION

Figure 1A:
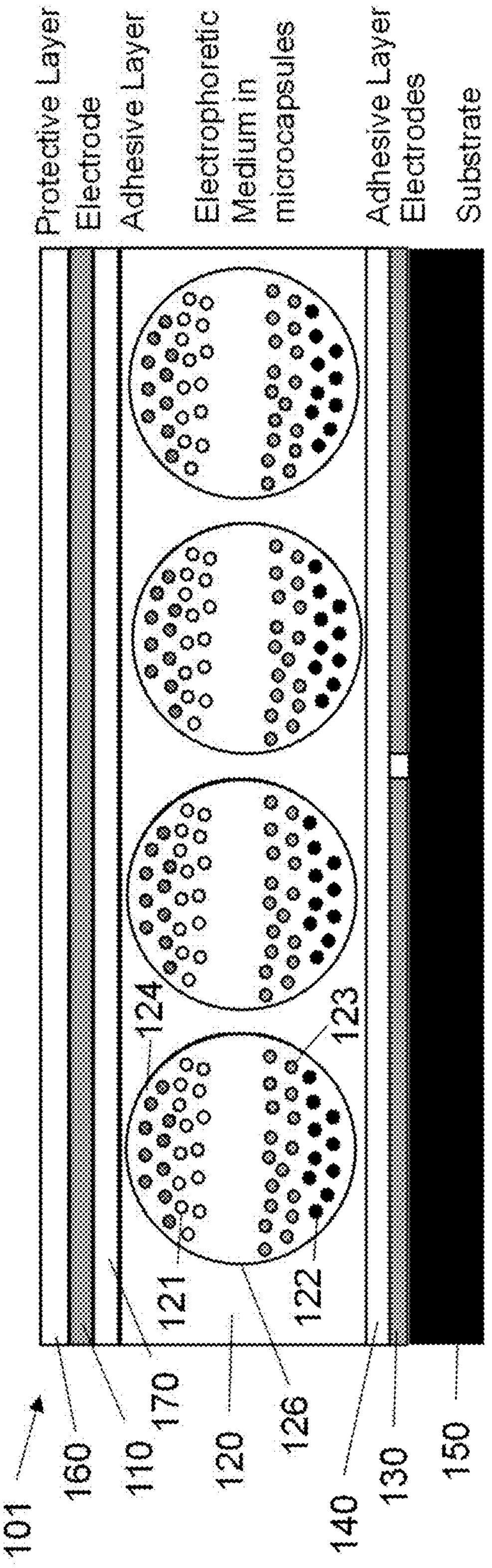
FIG. 1A is a representative cross-section of a four-particle electrophoretic display wherein the electrophoretic medium is encapsulated in microcapsules.

Electrophoretic displays and methods for fabricating electrophoretic displays including two, three, four (or more) particles have been discussed in the prior art. The electrophoretic fluid may be encapsulated in microcapsules or incorporated into microcell structures that are thereafter sealed with a polymeric layer. The microcapsule or microcell layers may be coated or laminated to a plastic substrate or film bearing a transparent coating of an electrically conductive material. Alternatively, the microcapsules may be coated onto a light transmissive substrate or other electrode material using spraying techniques. (See U.S. Pat. No. 9,835,925, incorporated by reference herein). The resulting assembly may be laminated to a backplane including pixel electrodes using an electrically conductive adhesive. The assembly may alternatively be attached to one or more segmented electrodes on a backplane, wherein the segmented electrodes are driven directly. In another embodiment the assembly, which may include a non-planar light transmissive electrode material is spray coated with capsules and then overcoated with a back electrode material. (See U.S. Patent Publication No. 2021/0132459, incorporated by reference herein.) Alternatively, the electrophoretic fluid may be dispensed directly on a thin open-cell grid that has been arranged on a backplane including an active matrix of pixel electrodes. The filled grid can then be top-sealed with an integrated protective sheet/light-transmissive electrode.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

Electrophoretic media used herein include charged particles that vary in color, reflective or absorptive properties, charge density, and mobility in an electric field (measured as a zeta potential). A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention. For example, the electrophoretic medium might include a fluid, a plurality of first and a plurality of second particles dispersed in the fluid, the first and second particles bearing charges of opposite polarity, the first particle being a light-scattering particle and the second particle having one of the subtractive primary colors, and a plurality of third and a plurality of fourth particles dispersed in the fluid, the third and fourth particles bearing charges of opposite polarity, the third and fourth particles each having a subtractive primary color different from each other and from the second particles, wherein the electric field required to separate an aggregate formed by the third and the fourth particles is greater than that required to separate an aggregate formed from any other two types of particles.

The electrophoretic media of the present invention may contain any of the additives used in prior art electrophoretic media as described for example in the E Ink and MIT patents and applications mentioned above. Thus, for example, the electrophoretic medium of the present invention will typically comprise at least one charge control agent to control the charge on the various particles, and the fluid may have dissolved or dispersed therein a polymer having a number average molecular weight in excess of about 20,000 and being essentially non-absorbing on the particles to improves the bistability of the display, as described in the aforementioned U.S. Pat. No. 7,170,670.

In one embodiment, the present invention uses a light-scattering particle, typically white, and three substantially non-light-scattering particles. There is of course no such thing as a completely light-scattering particle or a completely non-light-scattering particle, and the minimum degree of light scattering of the light-scattering particle, and the maximum tolerable degree of light scattering tolerable in the substantially non-light-scattering particles, used in the electrophoretic of the present invention may vary somewhat depending upon factors such as the exact pigments used, their colors and the ability of the user or application to tolerate some deviation from ideal desired colors. The scattering and absorption characteristics of a pigment may be assessed by measurement of the diffuse reflectance of a sample of the pigment dispersed in an appropriate matrix or liquid against white and dark backgrounds. Results from such measurements can be interpreted according to a number of models that are well-known in the art, for example, the one-dimensional Kubelka-Munk treatment. In the present invention, it is preferred that the white pigment exhibit a diffuse reflectance at 550 nm, measured over a black background, of at least 5% when the pigment is approximately isotropically distributed at 15% by volume in a layer of thickness 1 μm comprising the pigment and a liquid of refractive index less than 1.55. The yellow, magenta and cyan pigments preferably exhibit diffuse reflectances at 650, 650 and 450 nm, respectively, measured over a black background, of less than 2.5% under the same conditions. (The wavelengths chosen above for measurement of the yellow, magenta and cyan pigments correspond to spectral regions of minimal absorption by these pigments.) Colored pigments meeting these criteria are hereinafter referred to as "non-scattering" or "substantially non-light-scattering". Specific examples of suitable particles are disclosed in U.S. Pat. No. 9,921,451, which is incorporated by reference herein.

Alternative particle sets may also be used, including four sets of reflective particles, or one absorptive particle with three or four sets of different reflective particles, i.e., such as described in U.S. Pat. Nos. 9,922,603 and 10,032,419, which are incorporated by reference herein. For example, white particles may be formed from an inorganic pigment, such as $TiO_2$, $ZrO_2$, ZnO, $Al_2O_3$, $Sb_2O_3$, $BaSO_4$, $PbSO_4$ or the like, while black particles may be formed from CI pigment black 26 or 28 or the like (e.g., manganese ferrite black spinel or copper chromite black spinel) or carbon black. The third/fourth/fifth type of particles may be of a color such as red, green, blue, magenta, cyan or yellow. The pigments for this type of particles may include, but are not limited to, CI pigment PR 254, PR122, PR149, PG36, PG58, PG7, PB28, PB15:3, PY138, PY150, PY155 or PY20. Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

Figure 1B:
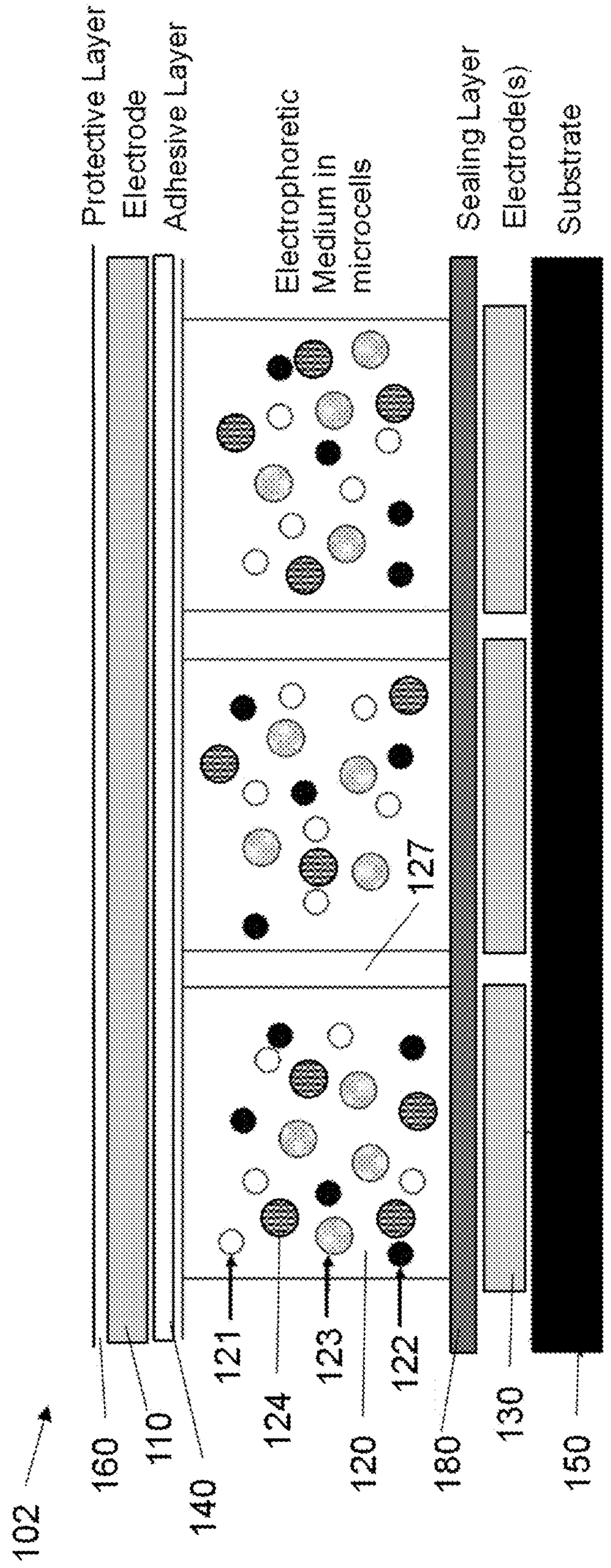
FIG. 1B is a representative cross-section of a four-particle electrophoretic display wherein the electrophoretic medium is encapsulated in microcells.
Figure 1C:
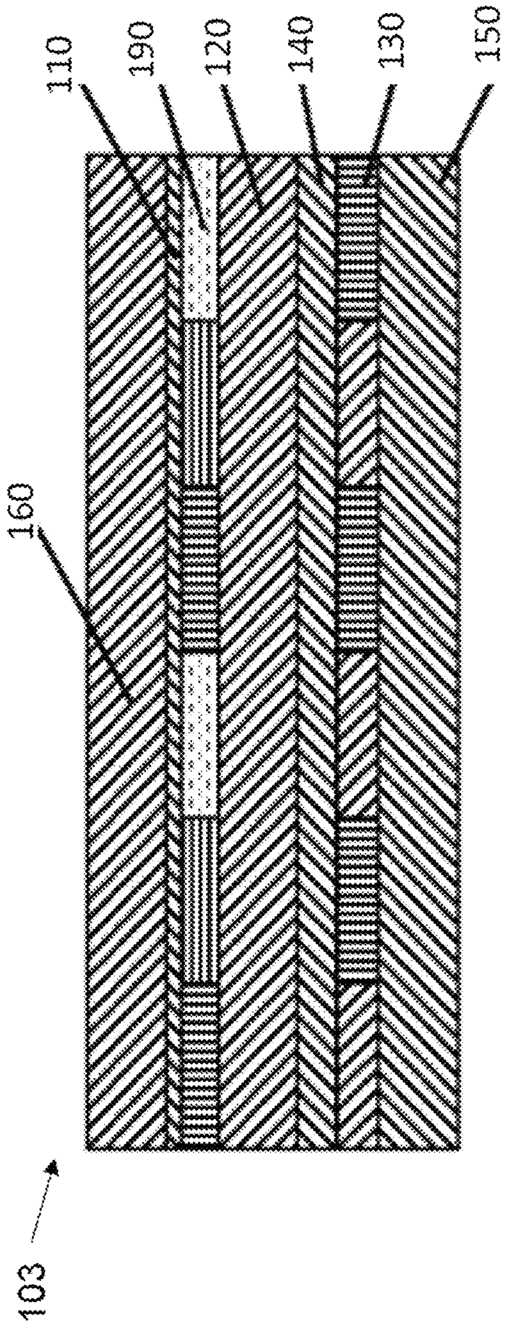
FIG. 1C is a representative cross-section of an electrophoretic display, e.g., including an electrophoretic layer of oppositely charged black and white particles, coupled to a color filter array (CFA) disposed between the electrophoretic layer and the viewer.
Figure 1E:
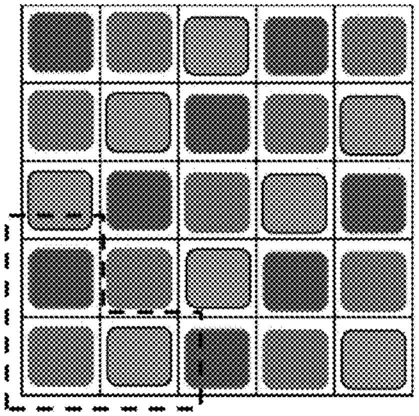
FIG. 1E is an exemplary RGB color filter array pattern that can be used with a CFA-enabled color electrophoretic display. The dashed line defines a "pixel" for the purposes of defining a pixel in an image. Each pixel of the RGB CFA includes an independently controllable red, green, and blue partially-transmissive filter portion, known as a subpixel; a portion around each subpixel is clear (a.k.a., partial fill CFA) in order to improve white and light colors in an image, but with higher overall resolution that in FIG. 1D. Below each subpixel is an independently-controllable pixel electrode of the type shown in FIG. 2B.
Figure 1D:
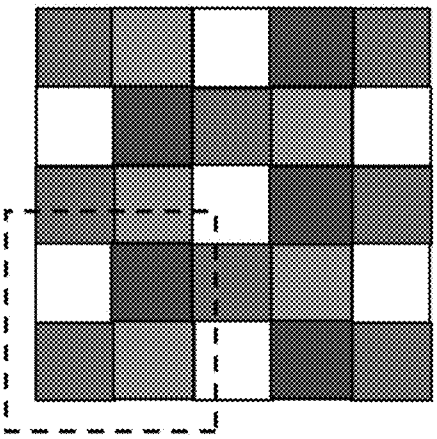
FIG. 1D is an exemplary RGBW color filter array pattern that can be used with a CFA-enabled color electrophoretic display. The dashed line defines a "pixel" for the purposes of defining a pixel in an image. Each pixel of the RGBW CFA includes an independently controllable red, green, and blue partially-transmissive filter portion, known as a "subpixel"; a clear (a.k.a. white) subpixel helps to improve white and light colors in an image. Below each subpixel is an independently-controllable pixel electrode of the type shown in FIG. 2B.

As shown in FIGS. 1A, 1B, and 1C, an electrophoretic display (101, 102, 103) typically includes a top transparent electrode 110, an electrophoretic medium 120, and a bottom electrode 130, which is often a pixel electrode of an active matrix of pixels controlled with thin film transistors (TFT). However, the bottom electrode 130 can be a singular larger electrode, such as a graphite backplane, a film of PET/ITO, a metalized film, or a conductive paint. In the electrophoretic media 120 described in FIGS. 1A and 1B, there are four different types of particles, 121, 122, 123, and 124, however more particle sets can be used with the methods and displays described herein. In the CFA display 103, the electrophoretic medium 120 may include an encapsulated electrophoretic medium with only black and white oppositely-charged particles. FIG. 1D is an exemplary RGBW color filter array pattern that can be incorporated in a CFA display 103. The colored elements may be provided directly the top transparent electrode 110, which may be, for example, indium-tin-oxide (ITO). Such CFA films are available from Toppan Printing (Japan). Alternatively, the color filter elements may be applied to the electrophoretic media 120 with an ink-jet or other precision printing process. See U.S. Pat. No. 10,209,556. As shown in FIGS. 1D and 1E, the dashed line defines a "pixel" for the purposes of defining a pixel in an image. In FIG. 1D, each pixel of the RGBW CFA includes independently-controllable red, green, and blue subpixels and an equally-sized clear (a.k.a. white) subpixel to improve white and lighter colors in an image. In FIG. 1E, pixel of the RGB CFA includes independently-controllable red, green, and blue subpixel with a portion around each subpixel being clear (a.k.a., partial fill CFA) in order to improve white and light colors in an image. In practice CFA patterns of FIG. 1E are preferred over the patterns of FIG. 1D because each image pixel is slightly smaller and thus a higher resolution can be achieved for the same number of pixel electrodes per inch (PPI), typically between 100 and 400 PPI, more commonly between 150 and 300 PPI.

In FIGS. 1A and 1B and similar embodiments, two of the four different types of particle sets, 121, 122, 123, and 124 are of first polarity, while the other two sets are of a second (opposite) polarity. In some embodiments, one of the four different types of particle sets, 121, 122, 123, and 124 is of first polarity, while the other three sets are of a second (opposite) polarity. In some embodiments two of the four different types of particle sets are of a first polarity, while the other two sets are of an opposite polarity. The electrophoretic medium 120 is typically compartmentalized such by a microcapsule 126 or the walls of a microcell 127. An optional adhesive layer 140 can be disposed adjacent any of the layers, however, it is typically adjacent an electrode layer (110 or 130). There may be more than one adhesive layer 140 in a given electrophoretic display (105, 106), however only one layer is more common. The entire display stack is typically disposed on a substrate 150, which may be rigid or flexible. The display (101, 102) typically also includes a protective layer 160, which may simply protect the top electrode 110 from damage, or it may envelop the entire display (101, 102) to prevent ingress of water, etc. Electrophoretic displays (101, 102) may also include sealing layers 180 as needed. In some embodiments the adhesive layer 140 may include a primer component to improve adhesion to the electrode layer 110, or a separate primer layer (not shown in FIG. 1B) may be used. The structures of electrophoretic displays and the component parts, pigments, adhesives, electrode materials, etc., are described in many patents and patent applications published by E Ink Corporation, such as U.S. Pat. Nos. 6,922,276; 7,002,728; 7,072,095; 7,116,318; 7,715,088; and 7,839,564, all of which are incorporated by reference herein in their entireties.

In some embodiments, e.g., as shown in FIG. 1A, the electrophoretic display may include only a first light-transmissive electrode, an electrophoretic medium, and a second (rear) electrode, which may also be light-transmissive. However, to produce a high-resolution display, e.g. e.g., as shown in FIG. 1B. Of course, each pixel must be addressable without interference from adjacent pixels so that an image file is faithfully reproduced in the display. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a select voltage such as to ensure that all the transistors in the selected row are conductive, while there is applied to all other rows a non-select voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.)

After a pre-selected interval known as the "line address time" the selected row is deselected, the next row is selected, and the voltages on the column drivers are changed so that the next line of the display is written. This process is repeated so that the entire display is written in a row-by-row manner. The entire process is coordinated with a clock circuit. The time between addressing a pixel for the nth time and the following addressing, n+1, is known as a "frame." Thus, a display that is updated at 60 Hz has frames that are 16 msec. "Frames" are not limited to use with an active matrix backplane, however. The driving frames described herein can also be used to refer to a unit of time between updates of, e.g., a singular backplane. While it is possible to drive electrophoretic media with an analog voltage signal, such as produced by a power supply and a potentiometer, the use of a digital controller discretizes the waveform into blocks that are typically on the order of 10 ms, however shorter or longer framewidths are possible. For example, a frame can be 0.5 ms, or greater, such as 1 ms, 5 ms, 10 ms, 15 ms, 20 ms, 30 ms, or 50 ms. In most instances a frame is less than 100 ms, such 250 ms, 200 ms, 150 ms, or 100 ms. In most applications described herein, the frame is between 5 ms and 30 ms in width, for example 8 ms in width. Specialized drive controllers for electrophoretic displays are available from, e.g., Ultrachip and Rockchip, however programmable voltage drivers can also be used, such as available from Digi-Key and other electronics components suppliers.

In a conventional electrophoretic display using an active matrix backplane, each pixel electrode has associated therewith a capacitor electrode (storage capacitor) such that the pixel electrode and the capacitor electrode form a capacitor; see, for example, International Patent Publication WO 01/07961. In some embodiments, N-type semiconductor (e.g., amorphous silicon) may be used to from the transistors and the "select" and "non-select" voltages applied to the gate electrodes can be positive and negative, respectively.

Figure 2A:
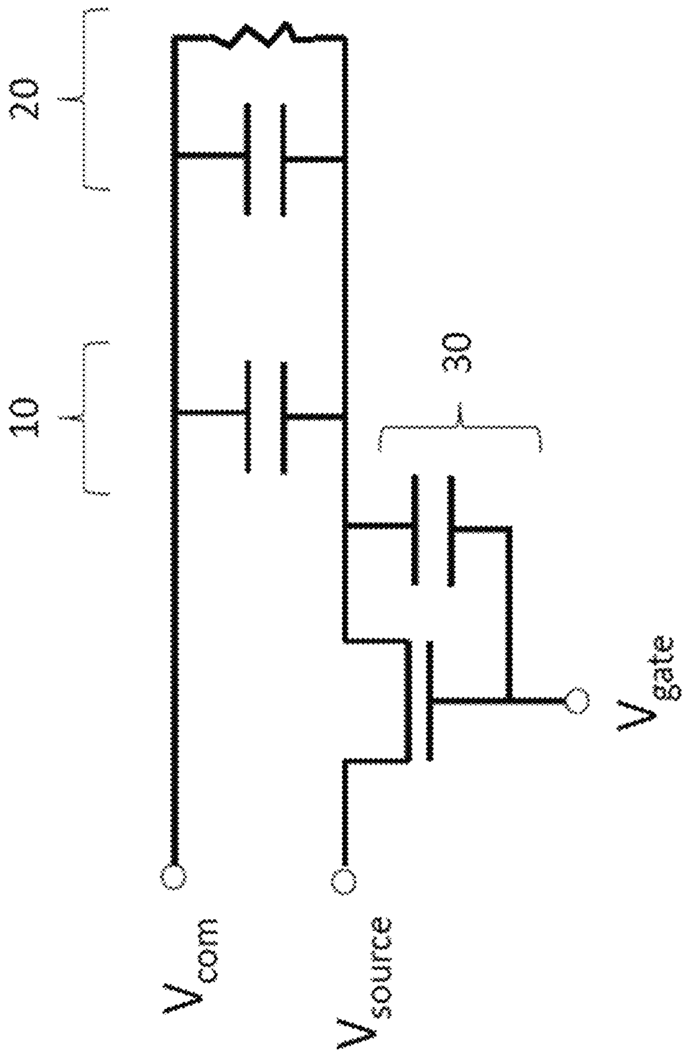
FIG. 2A illustrates an exemplary equivalent circuit of a single pixel of an electrophoretic display that uses an active matrix backplane with a storage capacitor.

FIG. 2A of the accompanying drawings depicts an exemplary equivalent circuit of a single pixel of an electrophoretic display. As illustrated, the circuit includes a capacitor 10 formed between a pixel electrode and a capacitor electrode. The electrophoretic medium 20 is represented as a capacitor and a resistor in parallel. In some instances, direct or indirect coupling capacitance 30 between the gate electrode of the transistor associated with the pixel and the pixel electrode (usually referred to a as a "parasitic capacitance") may create unwanted noise to the display. Usually, the parasitic capacitance 30 is much smaller than that of the storage capacitor 10, and when the pixel rows of a display is being selected or deselected, the parasitic capacitance 30 may result in a small negative offset voltage to the pixel electrode, also known as a "kickback voltage", which is usually less than 2 volts. In some embodiments, to compensate for the unwanted "kickback voltage", a common potential $V_{com}$, may be supplied to the top plane electrode and the capacitor electrode associated with each pixel, such that, when $V_{com}$ is set to a value equal to the kickback voltage ($V_{KB}$), every voltage supplied to the display may be offset by the same amount, and no net DC-imbalance experienced.

Figure 2B:
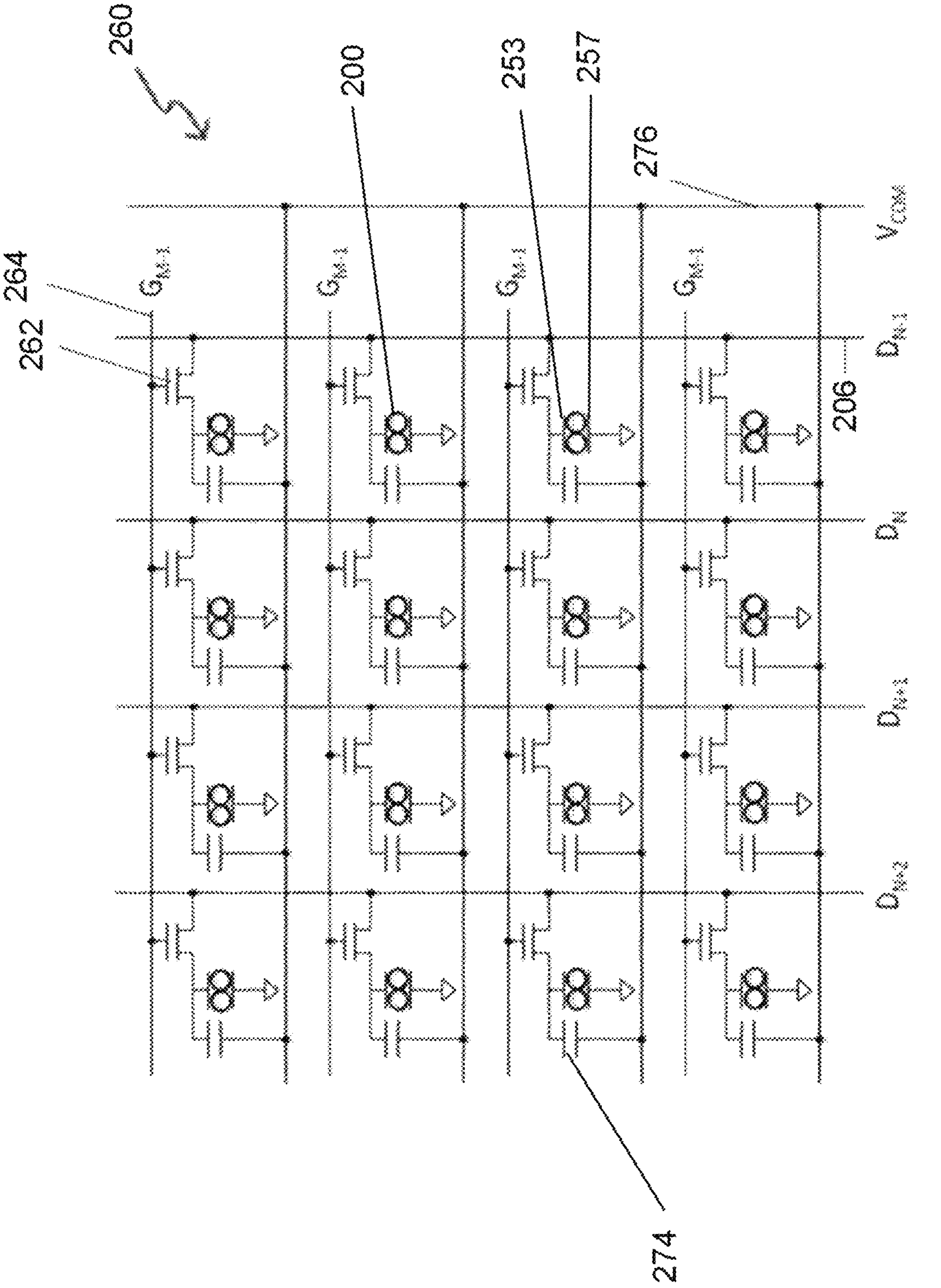
FIG. 2B illustrates an exemplary equivalent circuit of a simplified electrophoretic display of the invention, allowing driving in a row-column format.

In many embodiments, the TFT array forms an active matrix 260 for image driving, as shown in FIG. 2B. For example, each pixel electrode 253 (corresponding to 130 in FIGS. 1A and 1B) is coupled to a thin-film transistor 262 patterned into an array, and connected to gate (row) driver lines 264 and source (column) driver lines 206, running at right angles to the gate drive lines 264. Also, typically, the common (top) light-transparent electrode 257 (corresponding to 110 in FIGS. 1A and 1B) has the form of a single continuous electrode while the other electrode or electrode layer is patterned into a matrix of pixel electrodes 253, each of which defines one pixel of the display. Between the pixel electrode 253 and the common electrode 257, an electrophoretic medium 200 can be disposed. Any of the electrophoretic media described above may be used, and while FIG. 2B depicts the electrophoretic medium as contained in microcapsules, microcells, as shown in FIG. 1B, as also suitable. A source driver (not shown) is connected to the source driver lines 206 and provides source voltage to all TFTs 262 in a column that are to be addressed. A gate driver (not shown) is connected to the gate driver lines 264 to provide a bias voltage that will open (or close) the gates of each TFT 262 along the row. The gate scanning rate is typically ~60-150 Hz. When the TFTs 262 are n-type, taking the gate-source voltage positive allows the source voltage to be shorted to the drain. Taking the gate negative with respect to the source causes the drain source current to drop and the drain effectively floats. Because the scan driver acts in a sequential fashion, there is typically some measurable delay in update time between the top and bottom row electrodes. It is understood that the assignment of "row" and "column" electrodes is somewhat arbitrary and that a TFT array could be fabricated with the roles of the row and column electrodes interchanged. Each pixel of the active matrix 260 also includes a storage capacitor 274 as discussed above with respect to FIG. 2A. The storage capacitors 274 are typically coupled to $V_{com}$ line 276. In some embodiments the common light-transparent electrode 257 is coupled to ground, as shown in FIG. 2B. In other embodiments, the common light-transparent electrode 257 is also coupled to $V_{com}$ line 276 (not shown in FIG. 2B).

Figure 3:
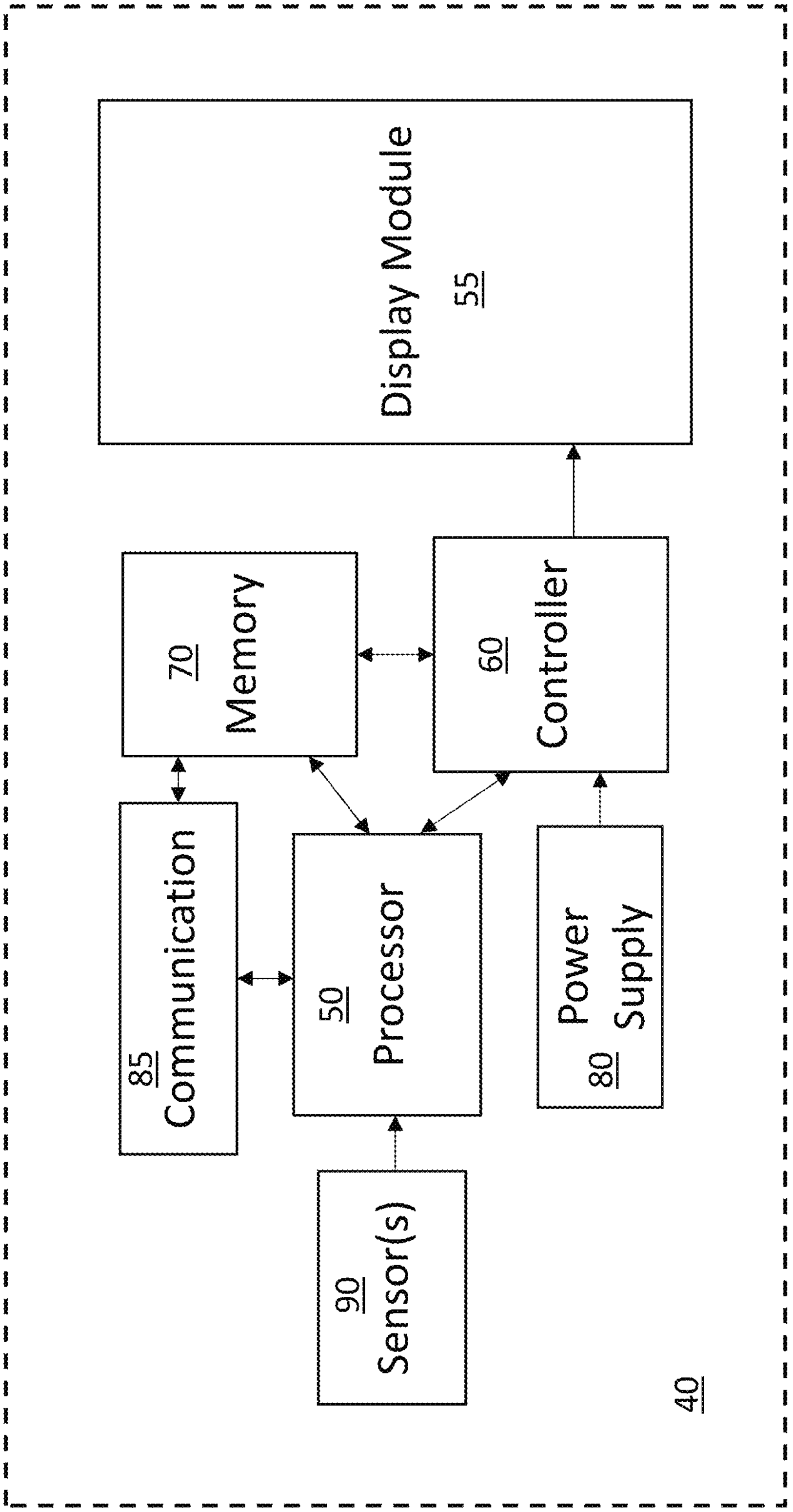
FIG. 3 illustrates an exemplary electrophoretic display that includes a display module. The electrophoretic display also includes a processor, memory, one or more power supplies, and a controller. The electrophoretic display may also include sensors to allow the electrophoretic display to adjust operational parameters based upon the ambient environment, e.g., temperature and illumination.

The active matrix 260 described with respect to FIG. 2B (i.e., including the electrophoretic medium 200 and the common light-transparent electrode 257) is typically covered by a protective sheet (e.g., integrated barrier) and sealed to create a display module 55, as shown in FIG. 3. Such a display module 55 becomes the focus of an electrophoretic display 40. The electrophoretic display 40 will typically include a processor 50, which is configured to coordinate the many functions relating to displaying content on the display module 55, and to transform "standard" images, such as sRGB images to a color regime that best duplicates the image on the display module 55. In some embodiments, the processor 50 performs the methods of the invention by determining which pixel electrodes should be updated during a partial update. Especially when dithering is being used for color production, the processor 50 can determine which areas of the dithered color are most at risk from blooming due to nearby pixel electrode updates. In other embodiments, some or all of the steps of the invention may be completed by the controller 60. As controller 60 architecture advances, more of the image processing can be embedded into the controller 60 such that an advanced controller can be incorporated into the same package as the display module 55 and pre-programmed with the tools needed to identify pixel electrodes that are at risk of blooming during a partial update. Advanced controllers for electrophoretic displays are available from ULTRACHIP and NEXTRONIX.

The processor 50 is typically a mobile processor chip made by manufacturers such Freescale or Qualcomm, although other manufacturers are known. The processor 50 is in frequent communication with the non-transitory memory 70, from which it pulls image files and/or look up tables to perform the color image transformations described below. The non-transitory memory 70 may also include gate driving instructions to the extent that a particular color transition may require a different gate driving pattern. The electrophoretic display 40 may have more than one non-transitory memory chip. The non-transitory memory 70 may be flash memory. Once the desired image has been converted for display on the display module 55, the specific image instructions are sent to a controller 60, which facilitates voltage sequences being sent to the respective thin film transistors (described above). Such voltages typically originate from one or more power supplies 80, which may include, e.g., a power management integrated chip (PMIC). The electrophoretic display 40 may additionally include communication 85, which may be, for example, WIFI protocols or BLUETOOTH, and allows the electrophoretic display 40 to receive images and instructions, which also may be stored in memory 70. The electrophoretic display 40 may additionally include one or more sensors 90, which may include a temperature sensor and/or a photo sensor, and such information can be fed to the processor 50 to allow the processor to select an optimum look-up-table when such look-up-tables are indexed for ambient temperature or incident illumination intensity or spectrum. In some instances, multiple components of the electrophoretic display 40 can be embedded in a singular integrated circuit. For example, a specialized integrated circuit may fulfill the functions of processor 50 and controller 60.

Figure 4A:
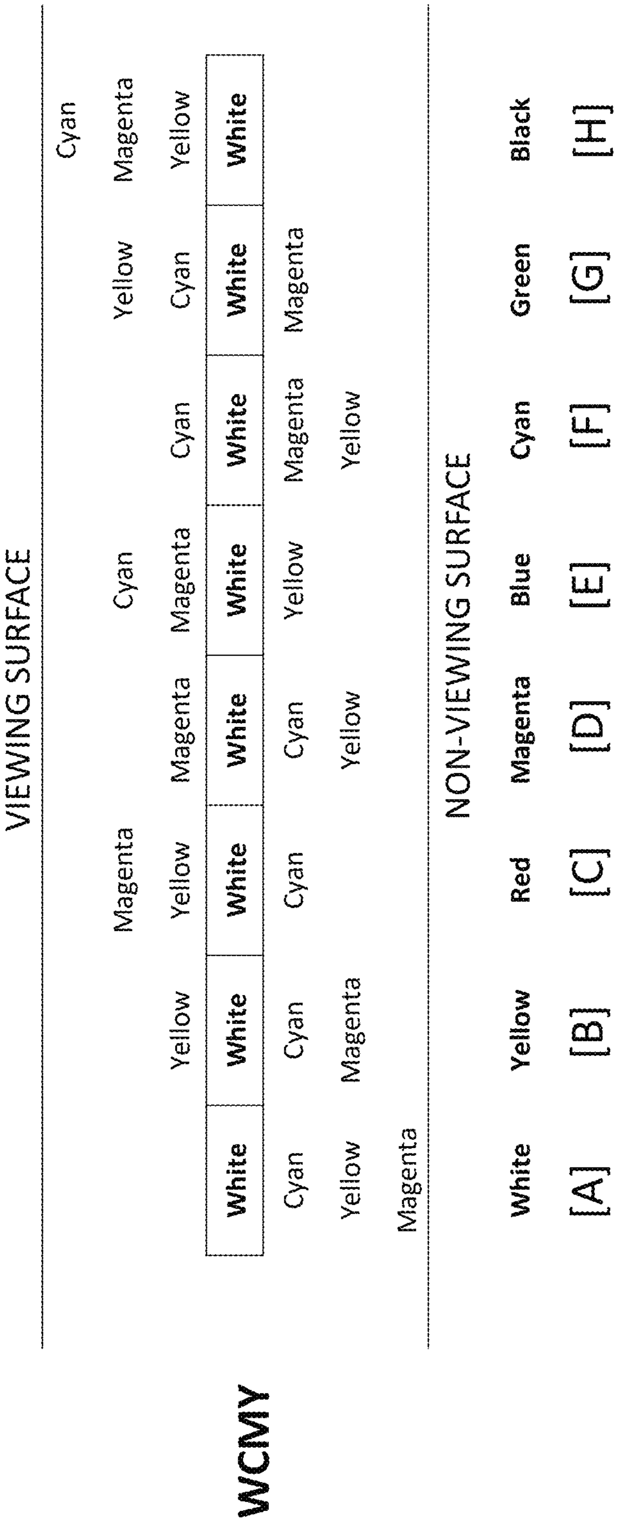
FIG. 4A illustrates the preferred position of each of the four sets of particles to produce eight standard colors in a white-cyan-magenta-yellow (WCMY) four-particle electrophoretic display, wherein the white particles are reflective and the cyan, magenta, and yellow particles are absorptive.

As discussed above, a color electrophoretic display may include a color filter array or an expanded particle system capable of producing all colors above each pixel electrode. As shown in FIG. 4A, in the instance of a four-particle system including subtractive cyan, yellow, and magenta particles paired with a reflective white particle, each of the eight principal colors (red, green, blue, cyan magenta, yellow, black and white) corresponds to a different arrangement of the four pigments. The three particles providing the three subtractive primary colors, e.g., for an Advanced Color electronic Paper (ACeP) display, may be substantially non-light-scattering ("SNLS"). The use of SNLS particles allows mixing of colors and provides for more color outcomes than can be achieved with the same number of scattering particles. These thresholds must be sufficiently separated relative to the voltage driving levels for avoidance of cross-talk between particles, and this separation necessitates the use of high addressing voltages for some colors. In addition, addressing the colored particle with the highest threshold also moves all the other colored particles, and these other particles must subsequently be switched to their desired positions at lower voltages.

The system of FIG. 4A, in principle, works similar to printing on bright white paper in that the viewer only sees those colored pigments that are on the viewing side of the white pigment (i.e., the only pigment that scatters light). In FIG. 4A, it is assumed that the viewing surface of the display is at the top (as illustrated), i.e., a user views the display from this direction, and light is incident from this direction. As already noted, in preferred embodiments only one of the four particles used in the electrophoretic medium of the present invention substantially scatters light, and in FIG. 4A this particle is assumed to be the white pigment. This light-scattering white particle forms a white reflector against which any particles above the white particles (as illustrated in FIG. 4A) are viewed. Light entering the viewing surface of the display passes through these particles, is reflected from the white particles, passes back through these particles and emerges from the display. Thus, the particles above the white particles may absorb various colors and the color appearing to the user is that resulting from the combination of particles above the white particles. Any particles disposed below (behind from the user's point of view) the white particles are masked by the white particles and do not affect the color displayed. Because the second, third and fourth particles are substantially non-light-scattering, their order or arrangement relative to each other is unimportant, but for reasons already stated, their order or arrangement with respect to the white (light-scattering) particles is critical.

More specifically, when the cyan, magenta and yellow particles lie below the white particles (Situation [A] in FIG. 4A), there are no particles above the white particles and the pixel simply displays a white color. When a single particle is above the white particles, the color of that single particle is displayed, yellow, magenta and cyan in Situations [B], [D] and [F] respectively in FIG. 4A. When two particles lie above the white particles, the color displayed is a combination of those of these two particles; in FIG. 4A, in Situation [C], magenta and yellow particles display a red color, in Situation [E], cyan and magenta particles display a blue color, and in Situation [G], yellow and cyan particles display a green color. Finally, when all three colored particles lie above the white particles (Situation [H] in FIG. 4A), all the incoming light is absorbed by the three subtractive primary colored particles and the pixel displays a black color. Because the order of the particles between the pixel electrode and viewer is critical, a pixel electrode that is not updated during a partial update can be disturbed by a neighboring pixel that is being updated. Furthermore, the resulting color shift may not be predictable because the highest charged particles, typically cyan, move the most due to inter-pixel coupling.

Figure 4B:
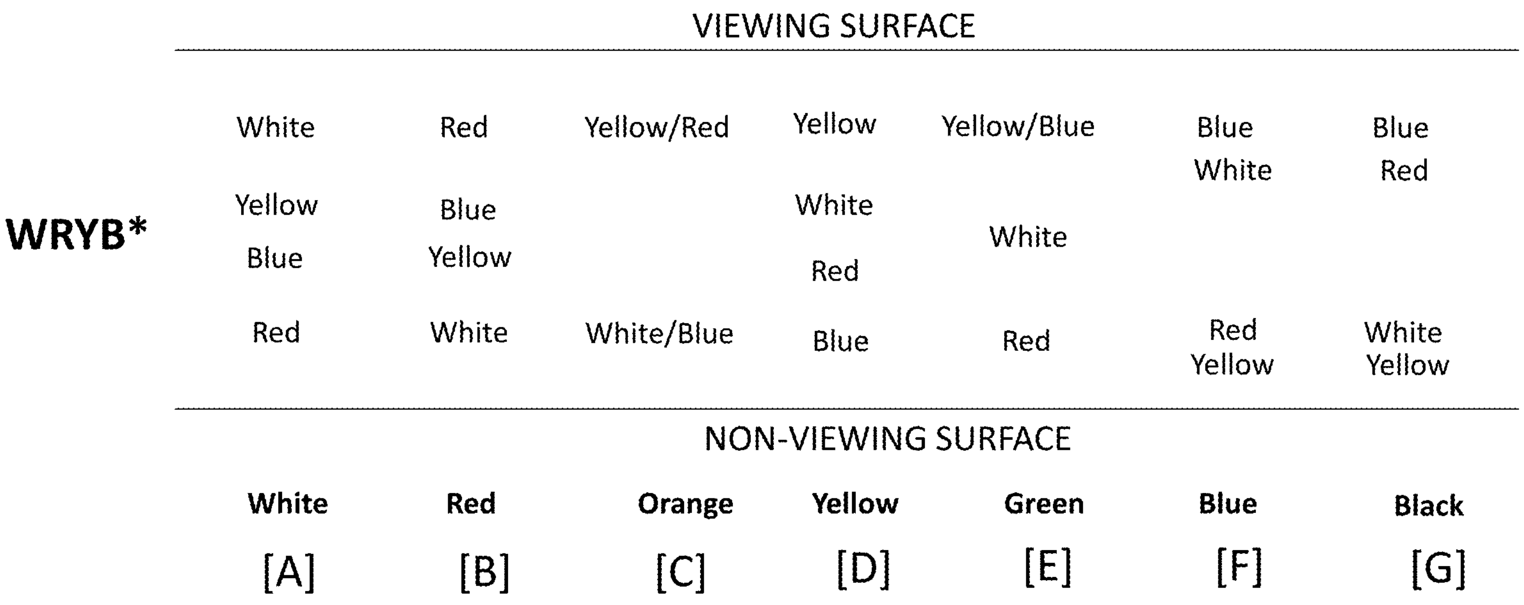
FIG. 4B illustrates the preferred position of each of the four sets of particles to produce seven standard colors in a white-red-yellow-blue semi-absorptive (WRYB*) four-particle electrophoretic display, wherein the white, red, and yellow particles are reflective and the blue particle is semi-absorptive (B*).

An alternative particle set using reflective color particles is shown in FIG. 4B. In the embodiment of FIG. 4B, the reflective particles are white, red, and yellow, and they are combined with a semi-transparent blue, however alternative color sets could be used provided that the combination of colors suitably spanned the useful color spectrum. In the system of FIG. 4B, for white, red, and yellow, the color viewed at the surface is due to direct reflection of the colored particles, for orange it is a mixture of red and yellow reflective pigments. For green, blue, and black at the viewing surface, the colors at the viewing surface are due to mixtures of the semi-transparent blue particle with reflective yellow, white, and red particles, respectively. Because a viewer is looking at light that is predominantly only interacting with one pigment surface, images produced with a system of FIG. 4B appear more saturated than the colors of FIG. 4A. However, the overall gamut of colors using a system of FIG. 4B is diminished as compared to those of FIG. 4A because it is difficult to achieve fine control of the amount of specific particles that are mixed together to create secondary colors (e.g., orange, green, violet). In applications such as digital signage, the saturation is often more important than the color gamut, and many users are satisfied with a set of seven or eight "standard" colors. It should also be realized with respect to FIG. 4B, that the reflective red and semi-transparent blue particles can switch roles, i.e., to make an electrophoretic display medium including reflective white, yellow, and blue particles and a semi-transparent red particle. Such a system yields a set of primary colors similar to FIG. 4B, but wherein red at the viewing surface results from a combination of semi-transparent red and white. Because the system of FIG. 4B includes mostly reflective particles, electrophoretic displays including this medium are less influenced by inter-pixel coupling. However, the methods of the invention can still be used with these systems.

Different combinations of light scattering and light absorbing particle sets are also possible. For example, one subtractive primary color could be rendered by a particle that scatters light, so that the display would comprise two types of light-scattering particle, one of which would be white and another colored. In this case, however, the position of the light-scattering colored particle with respect to the other colored particles overlying the white particle would be important. For example, in rendering the color black (when all three colored particles lie over the white particles) the scattering colored particle cannot lie over the non-scattering colored particles (otherwise they will be partially or completely hidden behind the scattering particle and the color rendered will be that of the scattering colored particle, not black). Of course, it would not be easy to render the color black if more than one type of colored particle scattered light without the presence of an absorptive black particle.

FIGS. 4A and 4B show idealized situations in which the colors are uncontaminated (i.e., the light-scattering white particles completely mask any particles lying behind the white particles in FIG. 4A, or the selected reflective particles shield all of the other particles that should not be visible in FIG. 4B). In practice, the masking by the white particles may be imperfect so that there may be some small absorption of light by a particle that ideally would be completely masked. Such contamination typically reduces both the lightness and the chroma of the color being rendered. In the instance of FIG. 4B, the presence of the light-absorbing particles often causes the overall image to look darker due to imperfect scattering of the reflective particles. This is particularly problematic for green hues because the human eye is very sensitive to different shades of green, whereas different shades of red are not as noticeable. In some embodiments, this can be corrected with the inclusion of additional particles with different steric or charge characteristics, e.g., a green scattering particle, however adding additional particles complicates the drive scheme and may require a wider range of driving voltages. Obviously, in the electrophoretic media described herein, such color contamination should be minimized to the point that the colors formed are commensurate with an industry standard for color rendition. A particularly favored standard is SNAP (the standard for newspaper advertising production), which specifies L*, a* and b* values for each of the eight primary colors referred to above.

Waveforms for driving four-particle electrophoretic media have been described previously. Waveforms for driving color electrophoretic displays having four particles are described in U.S. Pat. Nos. 9,921,451, 9,812,073, and 11,640,803, all of which are incorporated by reference herein. Most commercial electrophoretic displays use amorphous silicon based thin-film transistors (TFTs) in the construction of active matrix backplanes (260) because of the wider availability of fabrication facilities and the costs of the various starting materials. Amorphous silicon thin-film transistors may become unstable when supplied gate voltages that would allow switching of voltages higher than about +/−15V. Accordingly, as described in previous patents/applications on such systems, improved performance is achieved by additionally changing the bias of the top light-transmissive electrode with respect to the bias on the backplane pixel electrodes, a technique known as top-plane switching. Thus, if a voltage of +30V (relative to the backplane) is needed, the top plane may be switched to −15V while the appropriate backplane pixel is switched to +15V. Methods for driving a four-particle electrophoretic system with top-plane switching are described in greater detail in, for example, U.S. Pat. No. 9,921,451.

In alternative embodiments, metal oxide semiconductors may be incorporated into thin film transistors for active matrix backplanes (260), as described in U.S. Pat. No. 11,776,496, which is incorporated by reference in its entirety. One preferred metal oxide material for such applications is indium gallium zinc oxide (IGZO). IGZO-TFT has 20-50 times the electron mobility of amorphous silicon. By using IGZO TFTs in an active matrix backplane, it is possible to provide voltages of greater than 30V via a suitable display driver. Furthermore, a source driver capable of supplying at least five, and preferably seven levels provides a different driving paradigm for a four-particle electrophoretic display system. For example, the waveforms in a five-level drive scheme may be represented as V++, V+, 0, V−, and V−−, wherein V++ and V−− are at least 24V in magnitude. Additional voltage levels may be added, e.g., a seven-level drive scheme including V+++, V++, V+, 0, V−, V−−, and V−−−, wherein V+++ and V−−− are at least 24V in magnitude. As one example, the voltages in a seven-level drive scheme may be substantially +/−24V, +/−18V, +/−10V, and 0V. In some embodiments, the highest magnitude voltage levels may be 27V in magnitude or more, or 30V in magnitude or more.

Accordingly, in an embodiment, there will be two positive voltages, two negative voltages, and zero volts. In another embodiment, there will be three positive voltages, three negative voltages, and zero volts. In yet another embodiment, there will be four positive voltages, four negative voltages, and zero volts. These levels may be chosen within the range of about −27V to +27V, without the limitations imposed by top plane switching as described above.

Even when an electro-optic display includes a medium made up of only black and white charged particles, it is nonetheless still highly desirable to be able to present grayscale images on an electro-optic display. This grayscale may be achieved either by driving a pixel of the display to a gray state intermediate of the display's two extreme states (e.g., black and white). However, if the medium is not capable of achieving the desired number of intermediate states, or if the display is being driven by drivers that are not capable of providing voltages necessary to drive the charged ink particles to the desired number of intermediate states, other techniques such as half-toning or spatial dithering must be used to achieve the desired number of states.

When a dithered image is viewed at a sufficient distance, the individual colored pixels are merged by the human visual system into perceived uniform colors. Because of the trade-off between color depth and spatial resolution, dithered images when viewed closely have a characteristic graininess as compared to images in which the color palette available at each pixel location has the same depth as that required to render images on the display as a whole. However, dithering reduces the presence of color-banding, an artifact that is often more objectionable than graininess, especially when viewed at a distance.

There are various means known in the art to achieve a grayscale display using dithering techniques. Spatial modulation creates grayscale by dithering, a process by which a certain proportion of pixels within a localized area of the array of pixels (or cells) that comprise the display are set to a first color and the remainder of pixels in the localized area are set to a second color, giving the visual effect to one viewing the display of a shade in between the first and second colors. For example, to achieve a shade of gray, every other pixel in the localized area may be set to white and the remainder set to black. To achieve a lighter shade of gray, a higher proportion of pixels in the localized area may be set to white. To achieve a darker shade of gray, a higher proportion of pixels in the localized area may be set to black.

These half-toning and dithering techniques have been used for many decades in the printing industry to represent gray tones by covering a varying proportion of each pixel of white paper with black ink. Further, as indicated above, dithering can also be used to increase the quantity of colors an electrophoretic display is capable of presenting. Other shades and colors may be displayed or approximated by combining pixels set to two or more different colors. For example, similar half-toning schemes can be used with CMY or CMYK color printing systems, with the color channels being varied independently of each other.

Turning to display update time, when update time is not critical, such as for eReader applications where there can be several minutes between each page turn requiring an image update, a display may operate using a drive scheme such as "Global Complete" ("GC mode") where each pixel has the ability to fully transition from a first optical state to a second optical state during each image update. Of course, as described in, e.g., U.S. Pat. No. 10,657,869, such updates can be time consuming (e.g., 1 second or more), especially when DC balancing and remnant voltage management are required to achieve the highest quality colors. For this reason, displays typically use faster update schemes for displaying animated or video content, where a very quick update is desired and the user is willing to sacrifice fidelity in exchange for a faster update experience. Such quicker update schemes are typically known as "Direct Update" ("DU mode") and typically involve simply driving the electrophoretic medium to the black and white extents. See, e.g., U.S. Pat. No. 9,672,766. For higher end products, such as color eReaders/tablets, there may be multiple kinds of each mode, depending upon the content that is being displayed. Additional modes, such as animation (a.k.a. "A2 mode") may also be included, and the display controller may be programmed to automatically switch between modes depending upon the content being displayed. Update times for the faster update schemes are typically on the order of 100 ms.

As discussed above, half-toning and dithering techniques are typically employed to give the viewer the perception of uniform grayscale or intermediate colors despite the image being presented using a limited palette of available colors. However, such techniques can cause unpleasant patterns and textures to appear in images. Accordingly, algorithms for assigning particular colors to particular pixels have been developed in order to avoid or reduce these undesirable artifacts. Such algorithms may involve error diffusion, a technique in which error resulting from the difference between the color required at a certain pixel and the closest color in the per-pixel palette (i.e., the quantization residual) is distributed to neighboring pixels that have not yet been processed. European Patent No. 0677950 describes such techniques in detail, while U.S. Pat. No. 5,880,857 describes a metric for comparison of dithering techniques.

Accordingly, for animation and video content, the waveforms used from the faster drive schemes that are short enough in duration to allow for smooth animation can typically only drive pixels to extreme black or white states, or limited intermediate states, thus necessitating some form of half-toning or dithering with an algorithm such as error diffusion to prevent or reduce image artifacts. However, in practice, an error diffusion algorithm changes the value of certain pixels in an image as it distributes the quantization error (the difference between the original pixel value in the image and its quantized value) to neighboring pixels. The algorithm effectively "spreads out" the error across the image to create a more visually smooth result, despite using a limited color palette. This means that even during a transition between two closely correlated images such as consecutive images in a video or animation, the value of the dithered pixels may change from one extreme state to the other extreme state.

In 1-bit driving schemes for video and animation content, the general case is that during an update some fraction of the display pixels will remain at the same extreme optical state, and some equal number of remaining pixels will switch to an extreme optical state opposite to their current optical state. Ideally, the average brightness of the display remains substantially unchanged as a portion of the display pixels transition from white to black and another portion of the display pixels transitions from black to white. However, in practice, differences in the speed or velocity at which a display pixel transitions from white to black and from black to white can cause the average brightness of the display to vary during an image transition, leading to visible artifacts such as flicker or flashiness. For example, a display may appear momentarily dimmer or brighter (or of a different color for CFA or color displays) than it should be before all of the transitioning charged particles reach their final optical state.

Figure 5A:
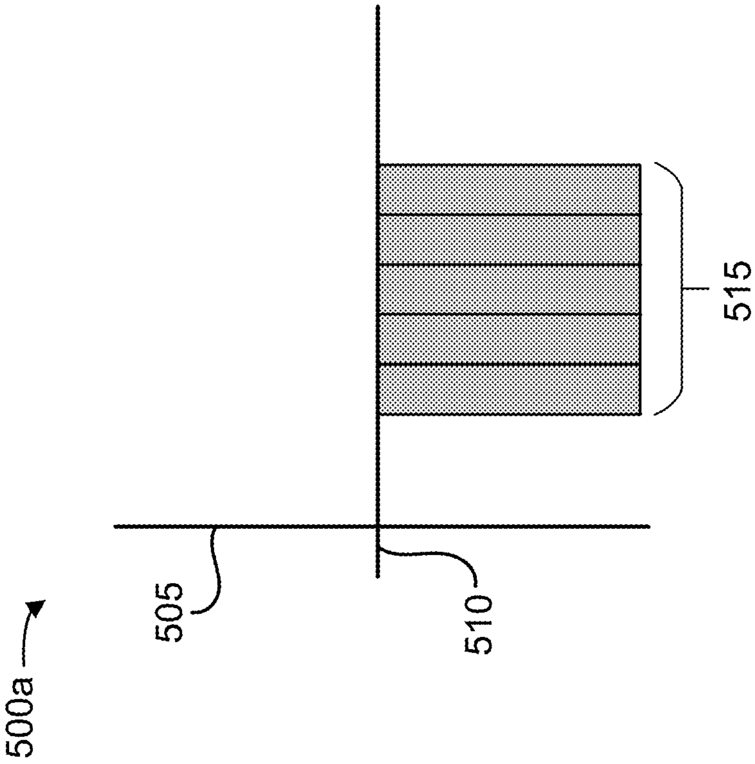
FIG. 5A PRIOR ART
FIG. 5A shows a plot illustrating a conventional black-to-white driving waveform applied to a display pixel.

Referring to FIG. 5A, a plot 500*a* is shown illustrating a conventional black-to-white driving waveform 515 applied to a display pixel. In plot 500*a*, the unit of the x-axis 510 is frames, and the unit of the y-axis 505 is voltage. As shown in FIG. 5A, the black-to-white driving waveform 515 comprises five frames and is driven at a constant negative voltage. For example, black-to-white driving waveform 515 can provide a constant voltage of −24V for five frames to transition a display pixel from the extreme black optical state to the extreme white optical state.

Figure 5B:
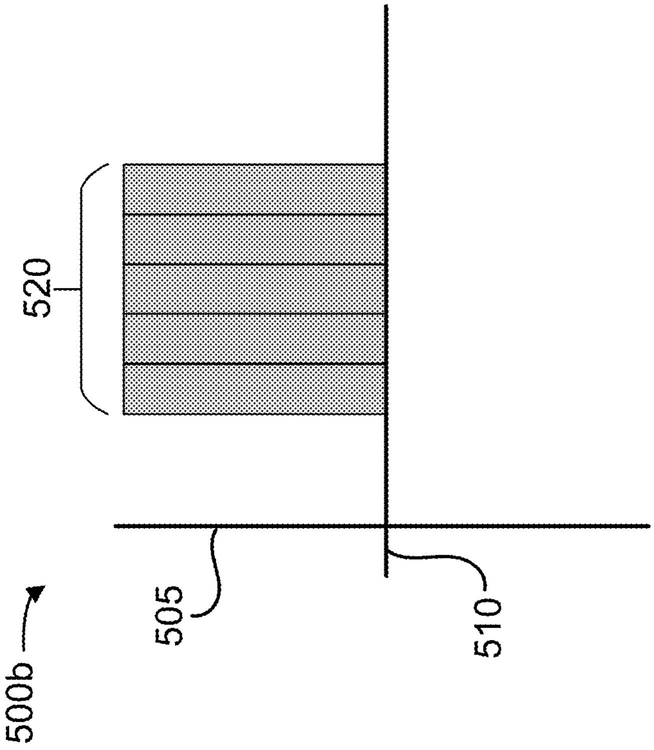
FIG. 5B PRIOR ART
FIG. 5B shows a plot illustrating a conventional white-to-black driving waveform applied to a display pixel.

Referring now to FIG. 5B, a plot 500*b* is shown illustrating a conventional white-to-black driving waveform 520 applied to a display pixel. In plot 500*b*, the unit of the x-axis 510 is frames, and the unit of the y-axis 505 is voltage. As shown in FIG. 5B, the white-to-black driving waveform 520 comprises five frames and is driven at a constant positive voltage. For example, white-to-black driving waveform 515 can provide a positive voltage of 24V for five frames to transition a display pixel from the extreme white optical state to the extreme black optical state.

One of skill in the art will appreciate that the examples shown in FIGS. 5A and 5B are exemplary and not limiting, and other waveforms driven for more or fewer than five frames at voltage more or less than +/−24V are within the scope of this disclosure.

In practice, optical transitions from white to black and from black to white are not uniform. The velocity and shape of the optical traces resulting from black-to-white and white-to-black driving waveform can be a function of several variables such as the type of electrophoretic medium and other materials that are used to fabricate the display, the voltage being applied to the display pixels, and ambient temperature.

Figure 6:
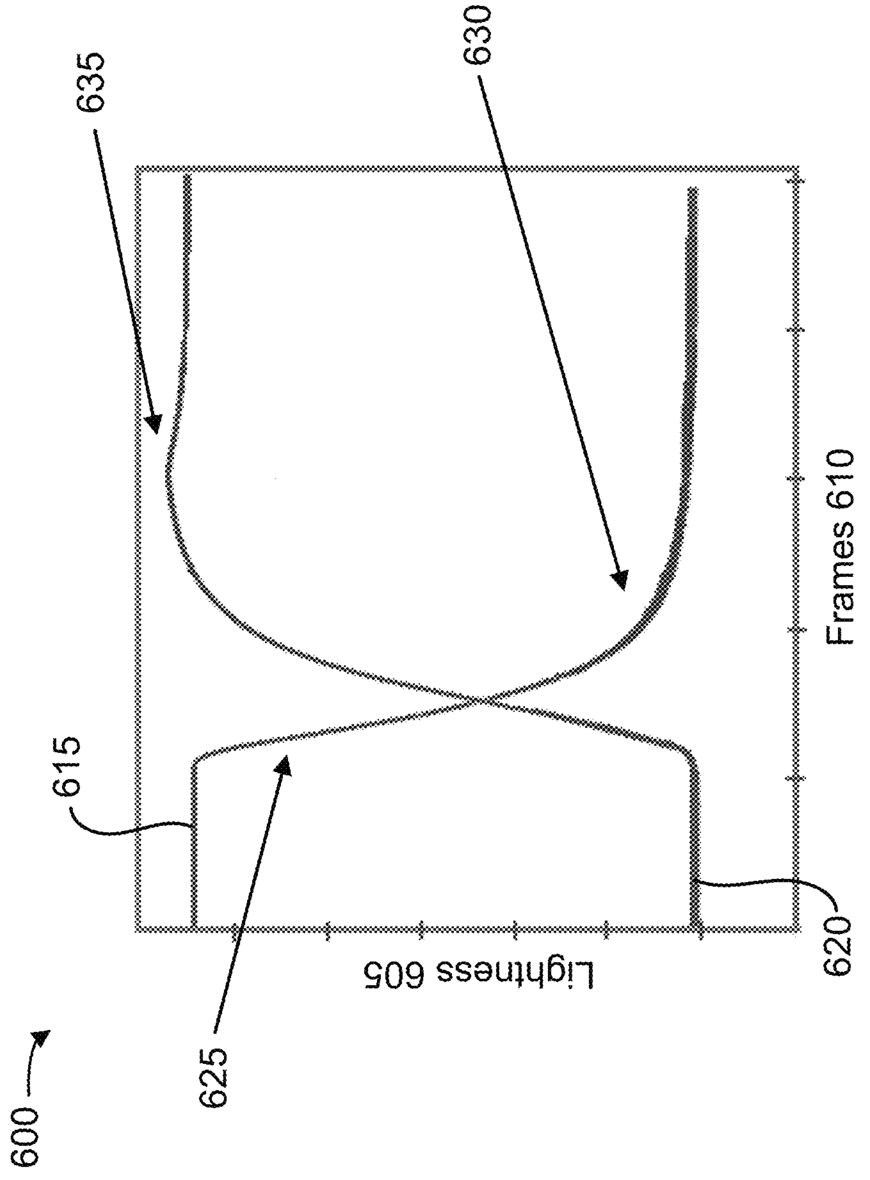
FIG. 6 PRIOR ART
FIG. 6 shows a plot of optical traces during black-to-white and white-to-black transitions caused upon application of the waveforms shown in FIGS. 5A and 5B.

FIG. 6 shows a plot 600 of optical traces during black-to-white and white-to-black transitions caused upon application of the waveforms shown in FIGS. 5A and 5B. In plot 600, the unit of the x-axis is frames 610, and the y-axis is lightness 605. Black-to-white optical trace 615 illustrates the resulting optical trace observed when the black-to-white driving waveform 515 of FIG. 5A is applied to a display pixel in the black optical state. White-to-black optical trace 620 illustrates the resulting optical trace observed when the white-to-black driving waveform 520 of FIG. 5B is applied to a display pixel in the white optical state.

As can be seen in FIG. 6, the magnitude of the slope or slew rate of black-to-white optical trace 615 (near annotation 625) is initially larger relative to the magnitude of the slope of white-to-black optical trace 620, and then gradually tapers off (near annotation 630) as the optical state of the display pixel saturates to the extreme black state. White-to-black optical trace 620 begins with a lower velocity with respect to black-to-white optical trace 615, and then overshoots the desired white state (near annotation 635) before converging back down to the extreme white state.

In this example, due to the difference in slew rate of the optical traces, display pixels going from white to black become darker faster than the display pixels going from black to white become lighter. As a result, the average lightness of the whole image "dips down" in average value, and appears momentarily dimmer than it should. Once all of the transitioning charged particles reach their final optical state, the average lightness returns to the desired level, but the noticeable dip in the average lightness value during the transition can be distracting to the viewer, especially if it occurs during video or animation content where the display is continuously being updated with new images.

The inventive subject matter disclosed herein provides methods for reducing flicker caused by this phenomenon during image transitions, dithered video playback, and animations. The velocity of each optical transition to black or white (or other input dither states) can be tuned to arrive at their respective optical states at substantially the same time. In addition, each optical trace can have a relatively smooth slope throughout the transition. As such, transition flicker can be reduced or avoided, especially in cases when transitioning between correlated images, one dithered image to another dithered image. Accordingly, applying black-to-white and white-to-black driving waveforms configured to match the velocity of the respective transitions ensures that visual flicker is minimized, and transition appearance is smooth.

The inventive subject matter disclosed herein include methods for driving an electrophoretic display to reduce visible flicker during display pixel transitions between optical states. A black-to-white driving or transition waveform can be generated including a number of voltage segments. Each voltage segment can be a voltage waveform that is applied to a display pixel for a fixed period of time. In some embodiments, a duration of each voltage segment corresponds to the duration of one frame during the period in which the display is being driven or updated.

Figure 7A:
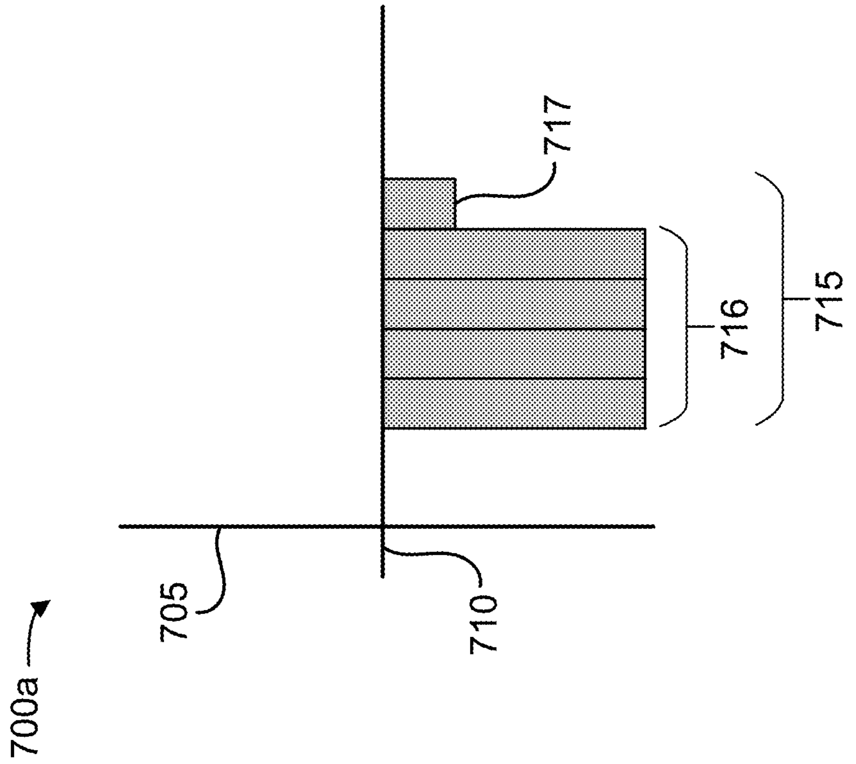
FIG. 7A shows a plot illustrating an exemplary black-to-white transition waveform according to the subject matter disclosed herein.

FIG. 7A shows a plot 700*a* illustrating an exemplary black-to-white transition waveform 715 according to the subject matter disclosed herein. In plot 700*a*, the unit of the x-axis 710 is frames, and the unit of the y-axis 705 is voltage. The black-to-white transition waveform 715 shown in FIG. 7A is similar to the black-to-white driving waveform 515 shown in FIG. 5A and comprises five voltage segments, each applied for the duration of one frame. However, black-to-white transition waveform 715 includes four full-velocity black-to-white voltage segments 716 (e.g., a first plurality of full-velocity black-to-white voltage segments having a first negative voltage) followed by a reduced velocity black-to-white voltage segment 717 (e.g., a reduced-velocity black-to-white voltage segment having a second negative voltage). As shown in FIG. 7A, reduced velocity black-to-white voltage segment 717 is the last voltage segment of the black-to-white transition waveform 715.

Reduced velocity black-to-white voltage segment 717 can provide a negative voltage having a magnitude smaller than the negative voltage provided by the full-velocity black-to-white voltage segments 716. For example, the full-velocity black-to-white voltage segments 716 can provide −24V for four frames and then reduced velocity black-to-white voltage segment 717 can provide −6V for one frame to transition a display pixel from the extreme black optical state to the extreme white optical state. In some embodiments, the first negative voltage has a magnitude at least three times larger than the second negative voltage.

Figure 7B:
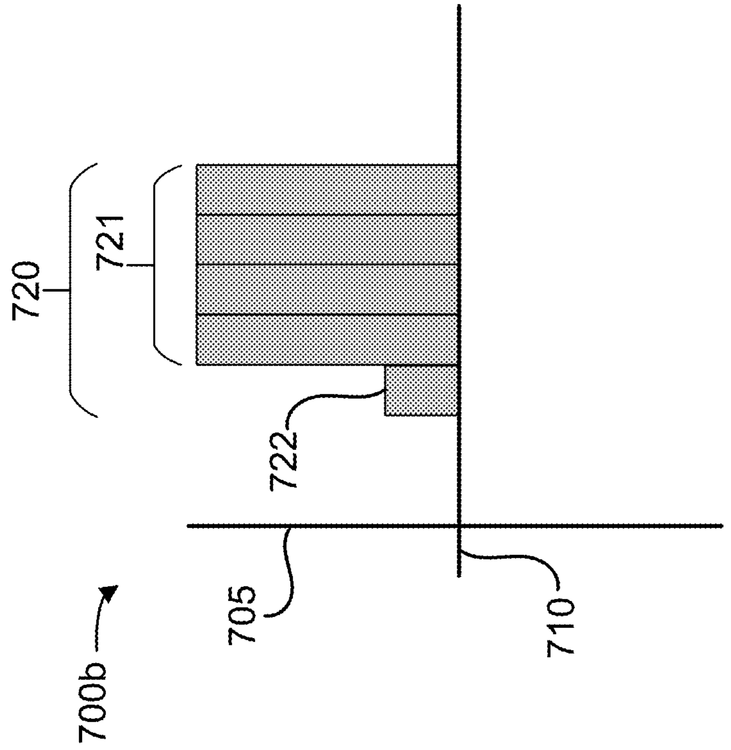
FIG. 7B shows a plot illustrating an exemplary white-to-black transition waveform according to the subject matter disclosed herein.

A white-to-black driving or transition waveform can be generated including a number of sequential voltage segments. Referring now to FIG. 7B, a plot 700*b* is shown illustrating an exemplary white-to-black transition waveform 720 according to the subject matter disclosed herein. In plot 700*b*, the unit of the x-axis 710 is frames, and the unit of the y-axis 705 is voltage. The white-to-black transition waveform 720 shown in FIG. 7B is similar to the white-to-black driving waveform 520 shown in FIG. 5B and comprises five voltage segments, each applied for the duration of one frame. However, in FIG. 7B, the first frame of white-to-black transition waveform 720 is a reduced velocity white-to-black voltage segment 722 (e.g., a reduced-velocity white-to-black voltage segment having a second positive voltage) followed by four full-velocity white-to-black voltage segments 721 (e.g., a first plurality of full-velocity white-to-black voltage segments having a first positive voltage). As shown in FIG. 7B, reduced velocity white-to-black voltage segment 722 is the first voltage segment of the white-to-black transition waveform 720.

The white-to-black transition waveform 720 can provide a positive voltage having a magnitude smaller than the positive voltage provided by each of the full-velocity white-to-black voltage segments 721. For example, reduced velocity white-to-black voltage segment 722 can provide 6V for one frame and the full-velocity white-to-black voltage segments 721 can provide 24V for four frames to transition a display pixel from the extreme white optical state to the extreme black optical state.

One of skill in the art will appreciate that the examples shown in FIGS. 7A and 7B are exemplary and not limiting, and other waveforms driven for more or fewer than five frames at voltages more or less than +/−6V and +/−24V are within the scope of this disclosure. In some embodiments, the first positive voltage has a magnitude at least three times larger than the second positive voltage.

According to the subject matter disclosed herein, the black-to-white transition waveform 715 is applied to display pixels transitioning from back to white at the same time as the white-to-black transition waveform 720 is applied to the display pixels transitioning from white to black. For example, during the first frame of a display update, the first segment of the four full-velocity black-to-white voltage segments 716 is applied to display pixels transitioning from back to white, while reduced velocity white-to-black voltage segment 722 is applied to display pixels transitioning from white to black. During the last frame of the display update, reduced velocity black-to-white voltage segment 717 is applied to display pixels transitioning from back to white, while the last of the four full-velocity white-to-black voltage segments 721 is applied to display pixels transitioning from white to black. Accordingly, the black-to-white transition waveform 715 is applied to a first display pixel during frames coincident with frames in which the white-to-black transition waveform 720 is applied to a second display pixel.

Using the waveform structure shown in FIG. 7B including a reduced velocity frame in the beginning of the transition waveform, the overshoot of the white-to-black optical trace can be minimized. In addition, beginning the transition waveform with the reduced velocity frame reduces the slope of the white-to-black optical trace such that the white-to-black optical trace reaches its final extreme black state substantially at or closer to the time the black-to-white optical trace reaches its final extreme white state. Further, the waveform structure shown in FIG. 7A including a reduced velocity frame at the end of the transition waveform does not significantly slow down the transition of the black-to-white optical trace to its final extreme white state, and ensures that DC balance is maintained.

The black-to-white transition waveform 715 and the white-to-black transition waveform 720 are configured such that a velocity of the transition of the first display pixel from black to white substantially matches a velocity of the transition of the second display pixel from white to black. Accordingly, the modifications to the waveforms described herein advantageously ensures the velocities of the optical traces in both directions are similar and the average lightness on the display is maintained, thereby eliminating or significantly reducing the flicker during image transitions to visually acceptable levels.

The inventive method described above is not limited to the waveform structures of FIGS. 7A and 7B. FIG. 8A shows a plot 800*a* illustrating an exemplary black-to-white transition waveform 815 according to the subject matter disclosed herein. In plot 800*a*, the unit of the x-axis 810 is frames, and the unit of the y-axis 805 is voltage. The black-to-white transition waveform 815 shown in FIG. 8A comprises five voltage segments, voltage segments 815*a*-815*e*, and each voltage segment is applied for a duration of one frame. Black-to-white transition waveform 815 includes three full-velocity black-to-white voltage segments, voltage segments

815*a*, 815*b*, and 815*d* (e.g., a first plurality of full-velocity black-to-white voltage segments having a first negative voltage), and two reduced velocity black-to-white voltage segments, voltage segments 815*c* and 815*e* (e.g., a first plurality of reduced-velocity black-to-white voltage segments having a second negative voltage).

As shown in FIG. 8A, in exemplary black-to-white transition waveform 815, two full-velocity black-to-white voltage segments (e.g., voltage segments 815*a* and 815*b*) are applied sequentially first, followed by one reduced velocity black-to-white voltage segment (e.g., voltage segment 815*c*), then another full-velocity black-to-white voltage segment (e.g., voltage segment 815*d*), and finally, a second reduced velocity black-to-white voltage segment (e.g., voltage segment 815*e*).

Reduced velocity black-to-white voltage segments (e.g., voltage segments 815*c* and 815*e* in FIG. 8A) can provide a negative voltage having a magnitude smaller than the negative voltage provided by the full-velocity black-to-white voltage segments (e.g., voltage segments 815*a*, 815*b*, and 815*d* in FIG. 8A). For example, voltage segments 815*a*, 815*b*, and 815*d* can provide −24V during three frames of the black-to-white transition waveform 815, and voltage segments 815*c* and 815*e* can provide −6V during two frames of the black-to-white transition waveform 815 to transition a display pixel from the extreme black optical state to the extreme white optical state. In some embodiments, the first negative voltage has a magnitude at least three times larger than the second negative voltage.

Figure 8B:
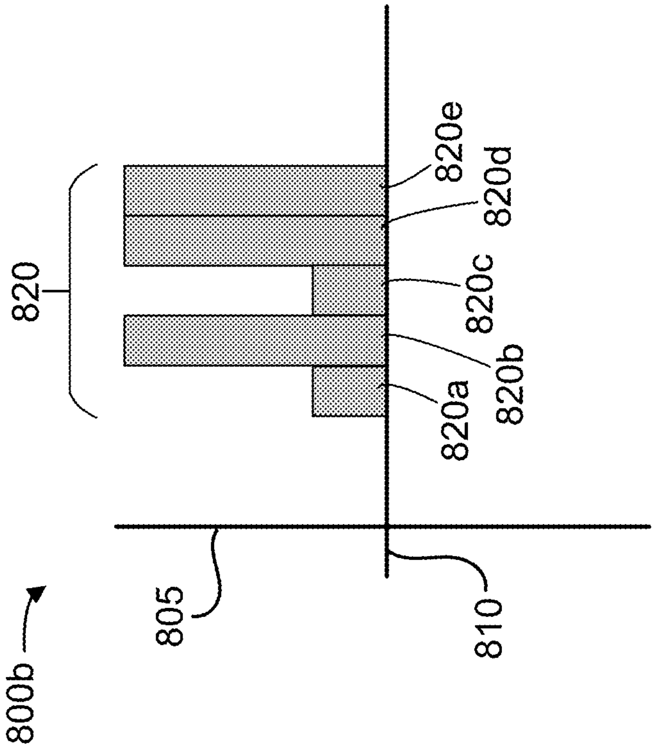
FIG. 8B shows a plot illustrating an exemplary white-to-black transition waveform according to the subject matter disclosed herein.
Figure 8A:
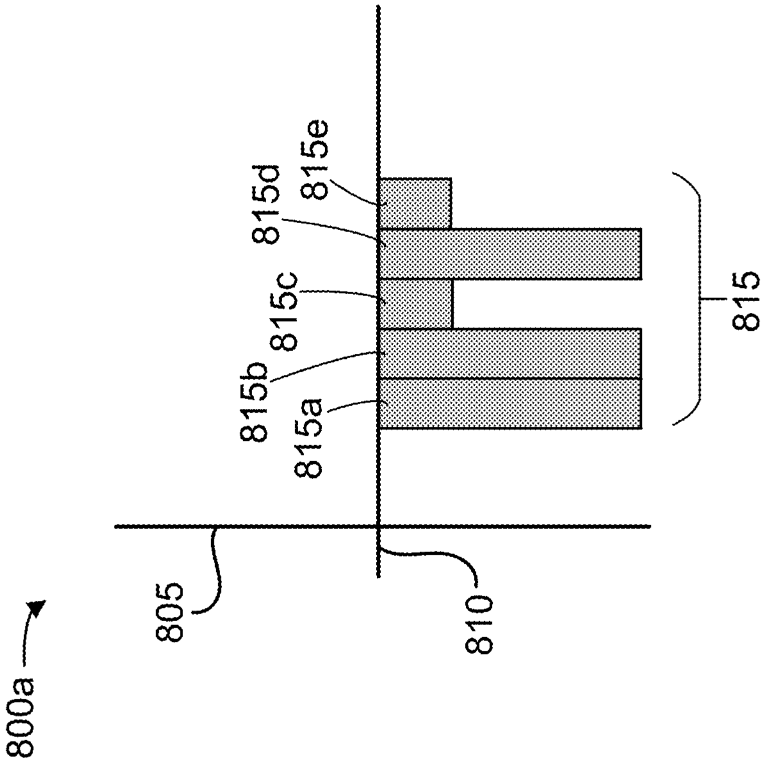
FIG. 8A shows a plot illustrating an exemplary black-to-white transition waveform according to the subject matter disclosed herein.

FIG. 8B shows a plot 800*b* illustrating an exemplary white-to-black transition waveform 820 according to the subject matter disclosed herein. In plot 800*b*, the unit of the x-axis 810 is frames, and the unit of the y-axis 805 is voltage. The white-to-black transition waveform 820 shown in FIG. 8B comprises five voltage segments, voltage segments 820*a*-820*e*, and each voltage segment is applied for a duration of one frame. White-to-black transition waveform 820 includes three full-velocity white-to-black voltage segments, voltage segments 820*b*, 820*d*, and 820*e* (e.g., a first plurality of full-velocity white-to-black voltage segments having a first positive voltage), and two reduced velocity white-to-black voltage segments, voltage segments 820*a* and 820*c* (e.g., a first plurality of reduced-velocity white-to-black voltage segments having a second positive voltage).

As shown in FIG. 8B, in exemplary white-to-black transition waveform 820, one reduced velocity white-to-black voltage segment (e.g., voltage segment 820*a*) is applied first, followed by one full-velocity white-to-black voltage segment (e.g., voltage segment 820*b*), then another reduced velocity white-to-black voltage segment (e.g., voltage segment 820*c*) is applied, finally followed by two full-velocity white-to-black voltage segments (e.g., voltage segments 820*d* and 820*e*) in sequence.

Reduced-velocity white-to-black voltage segments (e.g., voltage segments 820*a* and 820*c* in FIG. 8B) can provide a positive voltage having a magnitude smaller than the positive voltage provided by the full-velocity white-to-black voltage segments (e.g., voltage segments 820*b*, 820*d*, and 820*e* in FIG. 8B). For example, voltage segments 820*b*, 820*d*, and 820*e* can provide 24V during three frames of the white-to-black transition waveform 820, and voltage segments 820*a* and 820*c* can provide 6V during two frames of the white-to-black transition waveform 820 to transition a display pixel from the extreme black optical state to the extreme white optical state. In some embodiments, the first positive voltage has a magnitude at least three times larger than the second positive voltage.

According to the subject matter disclosed herein, the black-to-white transition waveform 815 is applied to display pixels transitioning from back to white at the same time as the white-to-black transition waveform 820 is applied to display pixels transitioning from white to black. For example, during the first frame of a display update, voltage segment 815*a* of the black-to-white transition waveform 815 is applied to display pixels transitioning from back to white, while voltage segment 820*a* of the white-to-black transition waveform 820 is applied to display pixels transitioning from white to black. Similarly, voltage segment 815*b* of the black-to-white transition waveform 815 is applied to display pixels transitioning from back to white, while voltage segment 820*b* of the white-to-black transition waveform 820 is applied to display pixels transitioning from white to black, and so forth for the remaining voltage segments of both transition waveforms. Accordingly, the black-to-white transition waveform 815 is applied to a first display pixel during frames coincident with frames in which the white-to-black transition waveform 820 is applied to a second display pixel.

As described above in reference to FIG. 8A, the full-velocity black-to-white voltage segments (e.g., voltage segments 815*a*, 815*b*, and 815*d*) and reduced velocity black-to-white voltage segments (e.g. voltage segments 815*c* and 815*e*) of the black-to-white transition waveform 815 are applied to display pixels in a particular order (e.g., the first plurality of full-velocity black-to-white voltage segments and the first plurality of reduced-velocity black-to-white voltage segments of the black-to-white transition waveform are applied to the first display pixel in a first order). Likewise, as described above in reference to FIG. 8B, the full-velocity white-to-black voltage segments (e.g., voltage segments 820*b*, 820*d*, and 820*e*) and reduced velocity white-to-black voltage segments (e.g. voltage segments 820*a* and 820*c*) of the white-to-black transition waveform 820 are applied to display pixels in a particular order (e.g., the first plurality of full-velocity white-to-black voltage segments and the first plurality of reduced-velocity white-to-black voltage segments of the white-to-black transition waveform are applied to the second display pixel in a second order).

In some embodiments, the order that the voltage segments of the white-to black transition waveform 820 are applied is a reverse permutation of the order in which the voltage segments of the black-to-white transition waveform 815 are applied. For example, as shown in FIGS. 8A and 8B, the black-to-white transition waveform 815 begins with two full-velocity black-to-white voltage segments (e.g., voltage segments 815*a* and 815*b*), while the white-to-black transition waveform 820 ends with two full-velocity white-to-black voltage segments (e.g., voltage segments 820*d* and 820*e*). The third voltage segment of both the black-to-white and white-to-black transition waveforms is a reduced-velocity voltage segment (e.g., voltage segments 815*c* and 820*c*). The second-to-last voltage segment of the black-to-white transition waveform 815 is a full-velocity black-to-white voltage segment (e.g., voltage segment 815*d*), while the second voltage segment of the while the white-to-black transition waveform 820 is a full-velocity white-to-black voltage segment (e.g., voltage segment 820*b*). Finally, the black-to-white transition waveform 815 ends with a reduced-velocity black-to-white voltage segment (e.g., voltage segment 815*e*), while the white-to-black transition waveform 820 begins with a reduced-velocity white-to-black voltage segment (e.g., voltage segment 820*a*).

This "mirrored" order to the types of voltage segments making up the black-to-white and white-to-black transition waveforms can be expressed accordingly: If the black-to-white transition waveform 815 comprises a sequence of i voltage segments (e.g., voltage segments 815*a*-815*e*), and the white-to-black transition waveform 820 comprises a sequence of n voltage segments (e.g., voltage segments 820*a*-820*e*), then an order in which the sequence of i voltage segments is applied to a first display pixel (e.g., a display pixel transitioning from black to white) corresponds to an order in which the sequence of n voltage segments is applied to the second display pixel (e.g., a display pixel transitioning from white to back) according to the function: $f(i)=n-i+1$, such that $A_i \Leftrightarrow B_{f(i)} = B_{n-i+1}$, where: $A_i$ represents the sequence of i voltage segments in order, and $B_{f(i)}$ represents the sequence of n voltage segments in order. Accordingly, by way of one example, if the first voltage segment of sequence i is a full-velocity black-to-white voltage segment, then the last voltage segment of sequence n is a full-velocity white-to-black voltage segment.

It has been found that configuring the order of the voltage segments of the black-to-white transition waveform 815 and the white-to-black transition waveform 820 as such results in a velocity of the transition of the first display pixel from black to white substantially matching a velocity of the transition of the second display pixel from white to black. Accordingly, the modifications to the waveforms described herein results in differing optical traces that reach their final optical state at substantially the same time. Further, the average lightness of the display is maintained throughout the optical transitions, and overshoot is similarly eliminated, thereby providing the same advantages as the aforementioned transition waveforms described in connection with FIGS. 7A and 7B.

The inventive methods described above are also not limited to 1-bit driving waveforms. The methods are also useful when going from different possible dither combinations of similar images, like one frame to another in temporal diffusion, or moving between different resolutions (e.g., 1-bit to 4- or 5-bit). Further, the methods disclosed herein can be used for graytone transitions or color transitions (in systems with color pigments) to ensure not only that the final state but also the velocity of different transitions are optimized to ensure smooth non-flashy transitions while maintaining a consistent average lightness level in dithered images.

As one example, for a given area of an image that has a 4-bit grayscale value of ⅜, to display the image in a 1-bit dithered format, for a group of eight display pixels in the area, three display pixels will be set to white, and five display pixels will be set to black. In order to convert from 1-bit image displaying to 4-bit image displaying, the techniques described above can be used to provide driving waveforms for the three display pixels transitioning from white to a ⅜ grayscale value, and also driving waveforms for the five display pixels transitioning from black to a ⅜ grayscale value. In this case, the driving waveforms are scaled such that even though the black and white charged particles must travel different distances to end up at the ⅜ grayscale value, all of the display pixels finish transitioning at substantially the same time, and a consistent average lightness level is maintained on the display while the display pixels are transitioning.

The capability to move between different resolutions provides other advantages. For example, 1-bit driving has a clearing effect since each display pixel is driven to one of the extreme optical states. Accordingly, in one embodiment, each time the display is updated with a new image, the new image is displayed in 1-bit mode several times, and then transitions to a higher resolution such as 5-bit mode.

In an alternate embodiment, instead of using reduced velocity frames to alter the slope and dampen optical traces, the voltage applied during the driving waveforms is frequency modulated. In some embodiments, the driving waveforms can be modulated at a frequency that is high enough to be imperceivable by the human eye. Such waveforms can reduce transition speed and provide additional robustness across different ambient operating temperatures.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The invention claimed is:

1. A method for driving an electrophoretic display to reduce visible flicker during display pixel transitions between optical states, the method comprising:

generating a black-to-white transition waveform comprising:

a first plurality of full-velocity black-to-white voltage segments having a first negative voltage, and a reduced-velocity black-to-white voltage segment having a second negative voltage, the second negative voltage having a magnitude smaller than the first negative voltage, wherein the at least one reduced-velocity black-to-white voltage segment is a last voltage segment of the black-to-white transition waveform;

generating a white-to-black transition waveform comprising:

a first plurality of full-velocity white-to-black voltage segments having a first positive voltage, and a reduced-velocity white-to-black voltage segment having a second positive voltage, the second positive voltage having a magnitude smaller than the first positive voltage, wherein the at least one reduced-velocity white-to-black voltage segment is a first voltage segment of the white-to-black transition waveform;

applying the black-to-white transition waveform to a first display pixel to transition an optical state of the first display pixel from black to white; and applying the white-to-black transition waveform to a second display pixel to transition an optical state of the second display pixel from white to black, wherein the black-to-white transition waveform and the white-to-black transition waveform are configured such that a velocity of the transition of the first display pixel from black to white substantially matches a velocity of the transition of the second display pixel from white to black.

2. The method of claim 1 wherein a duration of each voltage segment corresponds to a duration of one frame.

3. The method of claim 2 wherein the black-to-white transition waveform is applied to the first display pixel during frames coincident with frames in which the white-to-black transition waveform is applied to the second display pixel.

4. The method of claim 1 wherein the first negative voltage has a magnitude of substantially −24V.

5. The method of claim 1 wherein the second negative voltage has a magnitude of substantially −6V.

6. The method of claim 1 wherein the first positive voltage has a magnitude of substantially 24V.

7. The method of claim 1 wherein the second positive voltage has a magnitude of substantially 6V.

8. The method of claim 1 wherein the first negative voltage has a magnitude at least three times larger than the second negative voltage.

9. The method of claim 1 wherein the first positive voltage has a magnitude at least three times larger than the second positive voltage.

10. A method for driving an electrophoretic display to reduce visible flicker during display pixel transitions between optical states, the method comprising:

generating a black-to-white transition waveform comprising:

a first plurality of full-velocity black-to-white voltage segments having a first negative voltage, and a first plurality of reduced-velocity black-to-white voltage segments having a second negative voltage, the second negative voltage having a magnitude smaller than the first negative voltage, wherein at least one of the reduced-velocity black-to-white voltage segments is a last voltage segment of the black-to-white transition waveform;

generating a white-to-black transition waveform comprising:

a first plurality of full-velocity white-to-black voltage segments having a first positive voltage, and a first plurality of reduced-velocity white-to-black voltage segments having a second positive voltage, the second positive voltage having a magnitude smaller than the first positive voltage, wherein at least one of the reduced-velocity white-to-black voltage segments is a first voltage segment of the white-to-black transition waveform;

applying the black-to-white transition waveform to a first display pixel to transition an optical state of the first display pixel from black to white; and applying the white-to-black transition waveform to a second display pixel to transition an optical state of the second display pixel from white to black, wherein the black-to-white transition waveform and the white-to-black transition waveform are configured such that a velocity of the transition of the first display pixel from black to white substantially matches a velocity of the transition of the second display pixel from white to black.

11. The method of claim 10 wherein a duration of each voltage segment corresponds to a duration of one frame.

12. The method of claim 11 wherein the black-to-white transition waveform is applied to the first display pixel during frames coincident with frames in which the white-to-black transition waveform is applied to the second display pixel.

13. The method of claim 10 wherein the first negative voltage has a magnitude of substantially −24V.

14. The method of claim 10 wherein the second negative voltage has a magnitude of substantially −6V.

15. The method of claim 10 wherein the first positive voltage has a magnitude of substantially 24V.

16. The method of claim 10 wherein the second positive voltage has a magnitude of substantially 6V.

17. The method of claim 10 wherein the first negative voltage has a magnitude at least three times larger than the second negative voltage.

18. The method of claim 10 wherein the first positive voltage has a magnitude at least three times larger than the second positive voltage.

19. The method of claim 10 wherein the first plurality of full-velocity black-to-white voltage segments and the first plurality of reduced-velocity black-to-white voltage segments of the black-to-white transition waveform are applied to the first display pixel in a first order.

20. The method of claim 19 wherein the first plurality of full-velocity white-to-black voltage segments and the first plurality of reduced-velocity white-to-black voltage segments of the white-to black transition waveform are applied to the second display pixel in a second order that is a reverse permutation of the first order.

21. The method of claim 10 wherein the black-to-white transition waveform comprises a sequence of i voltage segments, and the white-to-black transition waveform comprises a sequence of n voltage segments, and an order in which the sequence of i voltage segments is applied to the first display pixel corresponds to an order in which the sequence of n voltage segments is applied to the second display pixel according to the function:

$$f(i)=n-i+1, \text{ such that } A_i \Leftrightarrow B_{f(i)}=B_{n-i+1},$$

where: $A_i$ represents the sequence of i voltage segments in order, and $B_{f(i)}$ represents the sequence of n voltage segments in order.

* * * * *